US012808395B2

(12) United States Patent
Nagatomi et al.

(10) Patent No.: US 12,808,395 B2
(45) Date of Patent: Nov. 24, 2026

(54) HYDRAULIC CONTROL DEVICE, HYDRAULIC CIRCUIT CONTROL METHOD, AND HYDRAULIC DEVICE

(71) Applicant: KUBOTA CORPORATION, Osaka (JP)

(72) Inventors: Yuichi Nagatomi, Osaka (JP); Junya Fushimi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/114,853

(22) PCT Filed: Aug. 25, 2023

(86) PCT No.: PCT/JP2023/030690
§ 371 (c)(1),
(2) Date: Mar. 25, 2025

(87) PCT Pub. No.: WO2024/075426
PCT Pub. Date: Apr. 11, 2024

(65) Prior Publication Data

US 2026/0029003 A1 Jan. 29, 2026

(30) Foreign Application Priority Data

Oct. 6, 2022 (JP) ................................ 2022-161867

(51) Int. Cl.
*F15B 21/00* (2006.01)
*E02F 9/22* (2006.01)
(Continued)

(52) U.S. Cl.
CPC .......... *F15B 21/001* (2013.01); *E02F 9/2203* (2013.01); *F15B 19/00* (2013.01);
(Continued)

(58) Field of Classification Search
CPC .......... F15B 2211/50536; F15B 11/165; F15B 2211/45; F16H 47/07
See application file for complete search history.

(56) References Cited

U.S. PATENT DOCUMENTS 5,394,697 A * 3/1995 Hirata .................. E02F 9/2235
60/426
2022/0234444 A1 7/2022 Edo et al.

FOREIGN PATENT DOCUMENTS

JP 10047306 A * 7/1996
JP H 10-47306 2/1998
(Continued)

OTHER PUBLICATIONS

Office Action, dated Sep. 16, 2025, in Japanese family member application No. 2022-161867 with English language translation thereof.

(Continued)

*Primary Examiner* — Abiy Teka
(74) *Attorney, Agent, or Firm* — Greenblum & Bernstein, P.L.C.

(57) ABSTRACT

A hydraulic control device includes: a virtual bleed information output unit that outputs virtual bleed information indicating a state of hydraulic oil flowing through a virtual bleed circuit based on an operation amount of an operation tool, a discharge pressure of a hydraulic pump, and a preset virtual bleed characteristic that is a characteristic of the virtual bleed circuit; a required bleed information output unit that outputs required bleed information indicating the state of hydraulic oil flowing through the virtual bleed circuit that is required to cause the hydraulic actuator to perform a desired operation based on the operation amount; a target control value determination unit that determines a target control value for the hydraulic pump based on a comparison result between the virtual bleed information and the required (Continued)

bleed information; and a pump control unit that controls the hydraulic pump on the target control value.

12 Claims, 14 Drawing Sheets

(51) Int. Cl.
*F15B 19/00* (2006.01)
*E02F 9/20* (2006.01)

(52) U.S. Cl.
CPC ........... *E02F 9/2004* (2013.01); *E02F 9/2296* (2013.01); *F15B 2211/45* (2013.01)

(56) References Cited

FOREIGN PATENT DOCUMENTS

| | | | | | |
|---|---|---|---|---|---|
| JP | 2004138187 A | * | 5/2004 | ............. | F03D 13/20 |
| JP | 2012-140763 A | | 7/2012 | | |
| JP | 2013148174 A | | 8/2013 | | |
| JP | 2019-87114 A | | 6/2019 | | |
| JP | 2021-6011 A | | 1/2021 | | |

OTHER PUBLICATIONS

Written Opinion with International Search Report, dated Oct. 24, 2023, issued in International Bureau of WIPO Patent Application No. PCT/JP2023/030690 with English translation thereof.
Extended European Search Report in counterpart EP Application No. 23874558.2, dated Aug. 31, 2026.

* cited by examiner

HYDRAULIC CONTROL DEVICE, HYDRAULIC CIRCUIT CONTROL METHOD, AND HYDRAULIC DEVICE

TECHNICAL FIELD

The present invention relates to a hydraulic control device that controls a hydraulic pump that operates an actuator, a hydraulic circuit control method, and a hydraulic device that includes a hydraulic control device.

BACKGROUND ART

As described in Patent Document 1, in an agricultural machine and a construction machine, actuators such as cylinders, which operate work devices, are controlled by pressurized oil (hydraulic oil) generated by a hydraulic pump in response to operation. The pressurized oil generated by the hydraulic pump is supplied from a tank, and its direction and flow rate are adjusted by a control valve in a hydraulic circuit, and is diverted to the actuator and to the tank.

Furthermore, from the viewpoint of energy conservation or the like, the flow rate of the pressurized oil diverted to the tank is virtualized as a virtual bleed flow rate, and the flow rate actually discharged from the hydraulic pump is calculated using a flow rate obtained by subtracting this virtual bleed flow rate from the pump discharge flow rate, and the hydraulic pump is controlled based on the calculated flow rate. As a result, only the pressurized oil at a flow rate excluding the pressurized oil diverted to the tank is supplied from the hydraulic pump to the hydraulic circuit, and the flow rate supplied to the hydraulic circuit is suppressed.

PRIOR ART DOCUMENT

Patent Document

Patent Document 1: JP 2012-140763A

DISCLOSURE OF THE INVENTION

Problem to be Solved by the Invention

However, when controlling the flow rate supplied to the hydraulic circuit taking into account the virtual bleed flow rate in advance, the discharge volume of the pressurized oil discharged from the hydraulic pump may vary depending on the pressure conditions and load state applied within the hydraulic circuit. Due to the variation in the discharge volume (discharge flow rate) of the pressurized oil, there may be instances where the actual operation of the actuator deviates from the operation performed on the actuator.

The present invention aims to accurately control the operation of an actuator in a hydraulic control device that controls the flow rate supplied to a hydraulic circuit taking into account the virtual bleed flow rate.

Means for Solving Problem

To achieve the above aim, a hydraulic control device according to an embodiment of the present invention is a hydraulic control device for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the hydraulic control device including: a virtual bleed information output unit that outputs virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line; a required bleed information output unit that outputs required bleed information indicating the state of hydraulic oil flowing through the virtual bleed circuit that is required to cause the hydraulic actuator to perform a desired operation based on the operation amount; a target control value determination unit that determines a target control value for the hydraulic pump based on a comparison result between the virtual bleed information and the required bleed information; and a pump control unit that controls the hydraulic pump based on the target control value.

To achieve the above aim, a hydraulic device according to one embodiment of the present invention is a hydraulic device includes: a hydraulic actuator; a hydraulic pump that discharges hydraulic oil; a control valve that switches between a supply state and a discharge state of hydraulic oil from the hydraulic pump to the hydraulic actuator based on an operation amount of an operation tool; and the hydraulic control device that controls the hydraulic pump.

To achieve the above aim, a hydraulic circuit control method according to one embodiment of the present invention is a control method for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the control method including: a virtual bleed information output step of outputting virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line; a required bleed information output step of outputting required bleed information indicating the state of hydraulic oil flowing through the virtual bleed circuit that is required to cause the hydraulic actuator to perform a desired operation based on the operation amount; a target control value determination step of determining a target control value for the hydraulic pump based on a comparison result between the virtual bleed information and the required bleed information; and a pump control step of controlling the hydraulic pump based on the target control value.

With such a hydraulic control device, hydraulic device, and hydraulic circuit control method, the hydraulic pump is controlled based on the comparison result between the virtual bleed information and the required bleed information.

Therefore, in the case where the load state, such as the pressure conditions within the hydraulic circuit, changes, when the load is high, the hydraulic pump is controlled taking into account the load state, and when the load is low, the hydraulic pump is controlled based on the required flow rate based on the operation performed on the operation tool regardless of the load state. As a result, hydraulic oil is supplied to the hydraulic pump at an appropriate discharge flow rate in accordance with the operation performed on the operation tool.

In addition, when the load is lower than the pump pressure output based on the virtual bleed characteristic, the control of the discharge flow rate is easily affected directly by the operation performed on the operation tool. On the other hand, when the load is higher than the pump pressure condition output based on the virtual bleed characteristic, the discharge flow rate is controlled taking into account a larger bleed flow rate corresponding to the load state, and the discharge flow rate is reduced. As a result, the operability of the operation tool changes based on the load state, the discharge flow rate is reduced, and the operating speed of the hydraulic actuator is suppressed, allowing the operator to feel the load state and perform control operations on the hydraulic actuator with good operability.

The virtual bleed information output unit may output a virtual bypass opening area corresponding to the operation amount based on a preset correspondence relationship between the operation amount and the virtual bypass opening area, the virtual bypass opening area being an opening area of a virtual control valve provided in the virtual bleed circuit, and output the virtual bleed information based on the output virtual bypass opening area and the discharge pressure.

With such a configuration, the virtual bleed information can be output easily and accurately.

The virtual bleed information output unit may output, as the virtual bleed information, a virtual bleed flow rate that is a flow rate of hydraulic oil flowing through the virtual bleed circuit, based on the virtual bypass opening area corresponding to the operation amount and the discharge pressure, the required bleed information output unit may output, as the required bleed information, a required bleed flow rate corresponding to the operation amount based on a preset correspondence relationship between the operation amount and the required bleed flow rate, the required bleed flow rate being a flow rate of hydraulic oil that is required to flow through the virtual bleed circuit in order to cause the hydraulic actuator to perform a desired operation based on the operation amount, and the target control value determination unit may output the target control value based on a larger flow rate of the virtual bleed flow rate output by the virtual bleed information output unit and the required bleed flow rate output by the required bleed information output unit.

With such a configuration, the operation of the hydraulic pump can be controlled using a target control value based on the load state by comparing the virtual bleed flow rate and the required bleed flow rate, and outputting the target control value using the larger bleed flow rate. As a result, the target control value based on the load state can be easily obtained, and the operation of the hydraulic pump can be easily and accurately controlled based on the load state and operation.

The virtual bleed information output unit may output the virtual bypass opening area corresponding to the operation amount based on a preset correspondence relationship between the operation amount and the virtual bypass opening area, and output, as the virtual bleed information, the virtual bleed flow rate corresponding to the virtual bypass opening area output based on the operation amount, and the discharge pressure, based on a correspondence relationship between the virtual bypass opening area, the discharge pressure, and the virtual bleed flow rate.

With such a configuration, the virtual bleed flow rate can be easily obtained from the opening area and discharge pressure output based on the operation amount.

The required bleed information output unit may output the required flow rate corresponding to the operation amount based on a preset correspondence relationship between the operation amount and a required flow rate that is a flow rate of hydraulic oil to be supplied to the hydraulic actuator to cause the hydraulic actuator to perform a desired operation based on the operation amount, and output the required bleed flow rate corresponding to the required flow rate output based on the operation amount based on a preset correspondence relationship between the required flow rate and the required bleed flow rate that is a flow rate of hydraulic oil that is required to flow into the virtual bleed circuit to supply hydraulic oil at the required flow rate.

With such a configuration, the required bleed flow rate can be easily obtained based on the required flow rate output based on the operation amount.

The virtual bleed information output unit may output, as the virtual bleed information, a virtual bleed differential pressure corresponding to: the virtual bypass opening area corresponding to the operation amount specified based on a preset correspondence relationship between the virtual bypass opening area corresponding to the operation amount, the discharge pressure, and the virtual bleed differential pressure, the virtual bleed differential pressure being a differential pressure across a throttle resistance provided in the virtual bleed circuit; and the discharge pressure, the required bleed information output unit may output, as the required bleed information, a required bleed differential pressure corresponding to the operation amount that is output based on a preset correspondence relationship between the operation amount and the required bleed differential pressure, the required bleed differential pressure being a differential pressure across the throttle resistance necessary for causing the hydraulic actuator to perform a desired operation based on the operation amount, and the target control value determination unit may output the target control value based on a larger differential pressure of the virtual bleed differential pressure output by the virtual bleed information output unit and the required bleed differential pressure output by the required bleed information output unit.

With such a configuration, the operation of the hydraulic pump can be controlled based on the load state by comparing the virtual bleed differential pressure and the required bleed differential pressure, and using the larger bleed differential pressure to obtain the target control value. At this time, the virtual bleed differential pressure can be easily obtained based on the operation amount and the discharge pressure, and the required bleed differential pressure can be easily obtained based on the operation amount.

The virtual bleed information output unit may specify the virtual bleed flow rate corresponding to the virtual bypass opening area corresponding to the operation amount and the discharge pressure, based on a preset correspondence relationship between the virtual bypass opening area corresponding to the operation amount, the discharge pressure, and a virtual bleed flow rate that is a flow rate of hydraulic oil flowing through the virtual bleed circuit, and output, as the virtual bleed information, the virtual bleed differential pressure corresponding to the virtual bleed flow rate specified based on a preset correspondence relationship between the virtual bleed flow rate and the virtual bleed differential pressure.

With such a configuration, the virtual bleed differential pressure can be easily output using the virtual bleed flow rate specified based on the operation amount. As a result, the operation of the hydraulic pump can be easily controlled based on the load state.

The required bleed information output unit may output the required bleed flow rate corresponding to the operation amount based on a preset correspondence relationship between the operation amount and a required bleed flow rate that is a flow rate of hydraulic oil that is required to flow through the virtual bleed circuit in order to cause the hydraulic actuator to perform a desired operation based on the operation amount, and output the required bleed differential pressure corresponding to the required bleed flow rate output based on the operation amount based on a preset correspondence relationship between the required bleed flow rate and the required bleed differential pressure, or output a required flow rate corresponding to the operation amount based on a preset correspondence relationship between the operation amount and the required flow rate, the required flow rate being a flow rate of hydraulic oil to be supplied to the hydraulic actuator to cause the hydraulic actuator to perform a desired operation based on the operation amount, output a required bleed flow rate corresponding to the required flow rate output based on the operation amount based on a preset correspondence relationship between the required flow rate and the required bleed flow rate, and output the required bleed differential pressure corresponding to the required bleed flow rate output based on the operation amount based on a preset correspondence relationship between the required bleed flow rate and the required bleed differential pressure.

With such a configuration, the required bleed differential pressure can be easily output, and the operation of the hydraulic pump can be easily controlled based on the load state.

The virtual bleed information output unit may output, as the virtual bleed information, a virtual pump flow rate corresponding to the operation amount and the discharge pressure based on a preset correspondence relationship between the virtual bypass opening area corresponding to the operation amount, the discharge pressure, and the virtual pump flow rate, the virtual pump flow rate being a flow rate of hydraulic oil discharged from the hydraulic pump when the virtual bleed circuit is assumed to be present, the required bleed information output unit may output, as the required bleed information, a required pump flow rate based on a preset correspondence relationship between the operation amount and the required pump flow rate, the required pump flow rate being a flow rate of hydraulic oil to be discharged from the hydraulic pump to supply hydraulic oil to the hydraulic actuator for operating the hydraulic actuator based on the operation amount, and the target control value determination unit may output the target control value based on a smaller pump flow rate of the virtual pump flow rate output by the virtual bleed information output unit and the required pump flow rate corresponding to the operation amount output from the required bleed information output unit.

With such a configuration, the operation of the hydraulic pump can be easily controlled based on the load state by easily obtaining the virtual pump flow rate and the required pump flow rate, comparing the virtual pump flow rate and the required pump flow rate, and obtaining the target control value using the smaller pump flow rate.

The pump control unit may output a target pump displacement based on the target control value determined by the target control value determination unit, and control the hydraulic pump so that a displacement of the hydraulic pump approaches the target pump displacement.

With such a configuration, the hydraulic pump can be more accurately controlled so that the hydraulic oil is supplied from the hydraulic pump based on the load.

The hydraulic control device may further include an actual pump displacement acquisition unit that acquires an actual pump displacement of the hydraulic pump or information that can specify the actual pump displacement, and the pump control unit may control the hydraulic pump so as to reduce a difference between the actual pump displacement of the hydraulic pump and the target pump displacement.

With such a configuration, the hydraulic pump can be controlled based on the actual pump displacement of the actual hydraulic pump, so that the hydraulic pump can be more accurately controlled.

The pump control unit may output a pump control command pressure required when the hydraulic pump discharges hydraulic oil corresponding to the target control value determined by the target control value determination unit by making a correction based on a difference between the actual pump displacement and the target pump displacement, and control the hydraulic pump.

With such a configuration, the hydraulic pump can be more easily and accurately controlled by correcting the pump control command pressure based on the differential displacement, which is the difference between the actual pump displacement and the target pump displacement, and controlling the hydraulic pump using the pump control command pressure.

BEST MODE FOR CARRYING OUT THE INVENTION

Hereinafter, a hydraulic circuit for controlling a front loader 13 mounted on a tractor, which is an example of a working machine or equipment such as an agricultural machine or a construction machine, will be described.

Overall Configuration of Tractor

Figure 1:
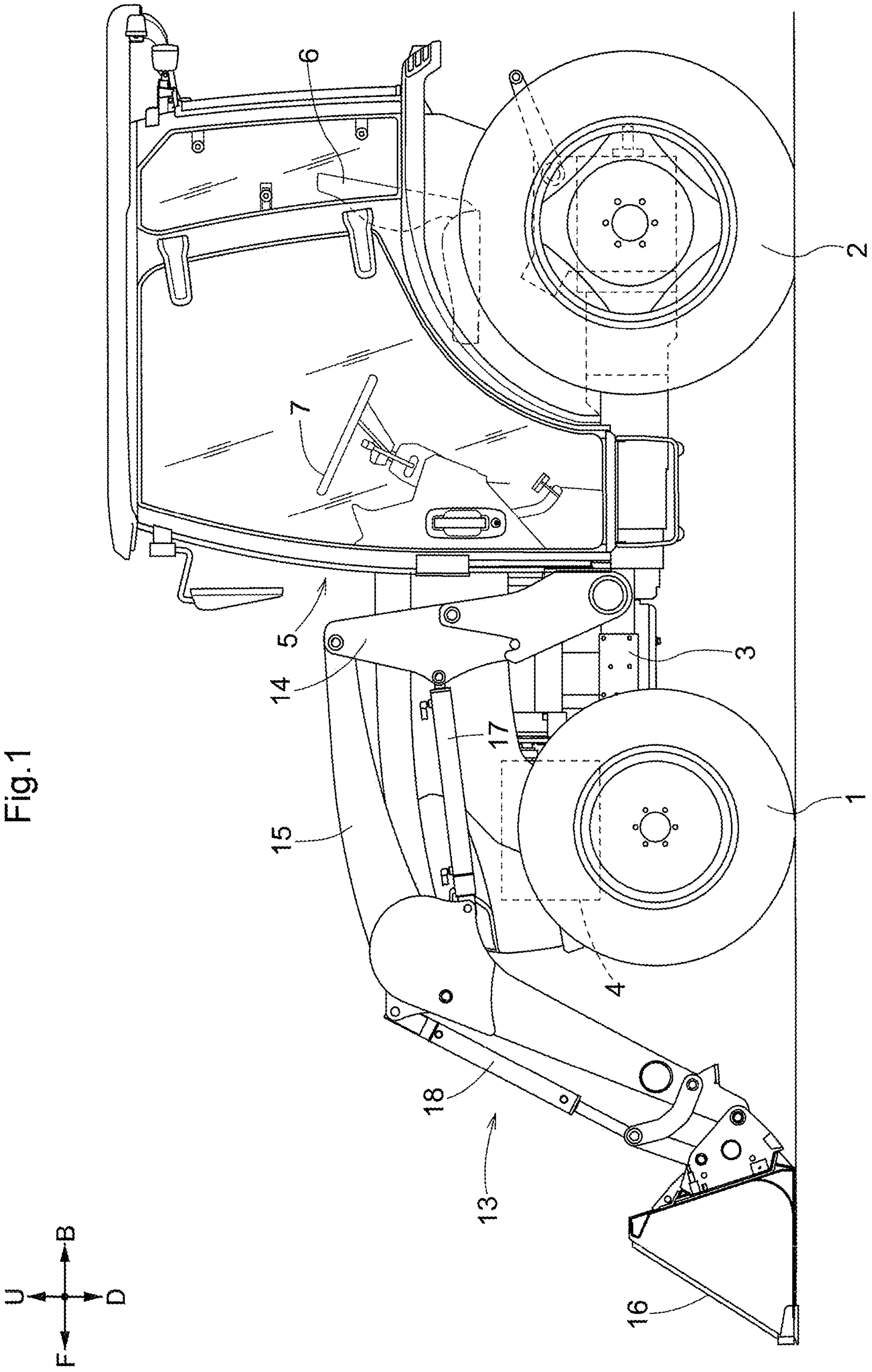
FIG. 1 is a left side view illustrating a tractor.

First, a configuration of a tractor will be described with reference to FIG. 1. The tractor includes a body 3 supported by left and right front wheels 1 and left and right rear wheels 2. An engine 4 is supported in a front portion of the body 3, and a driver's section 5 is provided on the body 3. The driver's section 5 is provided with a driver's seat 6, a steering wheel 7 for steering the front wheels 1, and so on.

In addition, the tractor includes a front loader 13 (equivalent to the work device) supported by the body 3. Left and right support frames 14 are connected to right and left portions of the body 3 and extend upward, and the front loader 13 is supported by the support frames 14. The front loader 13 includes left and right booms 15 and a bucket 16. The left and right booms 15 are supported at upper portions of the support frames 14 so as to be capable of swinging up and down and to extend forward, and the bucket 16 is supported at the front ends of the left and right booms 15 so as to be capable of swinging up and down.

Left and right double-acting boom cylinders 17 (equivalent to the hydraulic actuator) are connected between the support frames 14 and the booms 15. Left and right double-acting bucket cylinders 18 (equivalent to the hydraulic actuator) are connected between the booms 15 and the bucket 16. The booms 15 are raised and lowered by the extension and retraction of the boom cylinders 17. The bucket 16 is swung up and down by the extension and retraction of the bucket cylinders 18. The operating instructions for the booms 15 and the bucket 16 are received by an operation lever 35 (see FIG. 4, equivalent to the operation tool) provided in the driver's section 5.

Overall Configuration of Control Valve Unit

Hereinafter, the configuration of a control valve unit 8, which supplies and discharges hydraulic oil (pressurized oil) to and from the boom cylinders 17 and the bucket cylinders 18, will be described with reference to FIG. 2. The hydraulic circuit includes the control valve unit 8, the hydraulic actuators, and a hydraulic pump 22.

The control valve unit 8 includes a block-shaped valve case 9, and a control valve 10, a control valve 11, three relief valves 19, four check valves 21, and so on are housed in the valve case 9. Furthermore, the control valve unit 8 includes, in the valve case 9, a pump port 20, a tank port 24, a first port 31, a second port 32, a third port 33, and a fourth port 34.

In addition, the control valve unit 8 is connected to a variable displacement hydraulic pump 22 mounted on the body 3, and the hydraulic pump 22 is driven by the engine 4 or any drive unit (power source). The discharge flow rate of the hydraulic pump 22 is changed by controlling the angle of the swash plate of the hydraulic pump 22 using an operation cylinder 25.

That is to say, the control valve unit 8 controls the discharge flow rate and discharge pressure 74 (see FIG. 3) of the hydraulic oil discharged from the hydraulic pump 22 in response to the operation of the operation lever 35.

A transmission case 23 functions as a hydraulic oil tank. The hydraulic pump 22 discharges (supplies) the lubricating oil of the transmission case 23 mounted on the body 3 as a hydraulic oil to the pump port 20. The tank port 24 is connected to the transmission case 23.

Configurations of Control Valves in Control Valve Unit

Figure 2:
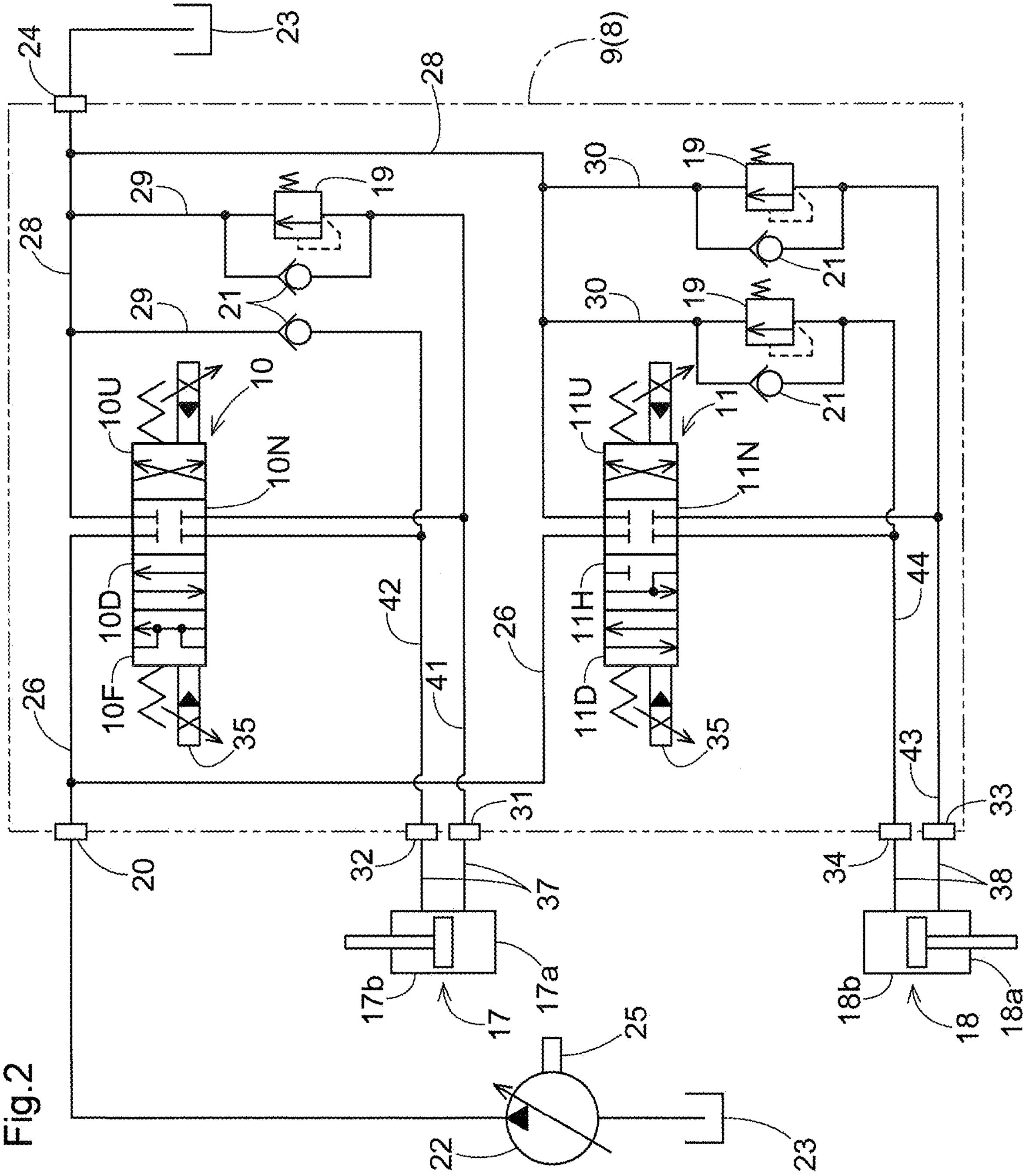
FIG. 2 is a schematic diagram showing an example of a configuration of a control valve unit.

As shown in FIG. 2, the control valve 10 has four positions: a first position 10U, a second position 10D, a third position 10F, and a neutral position 10N. The control valve 11 has four positions: a first position 11U, a second position 11H, a third position 11D, and a neutral position 11N.

Figure 3:
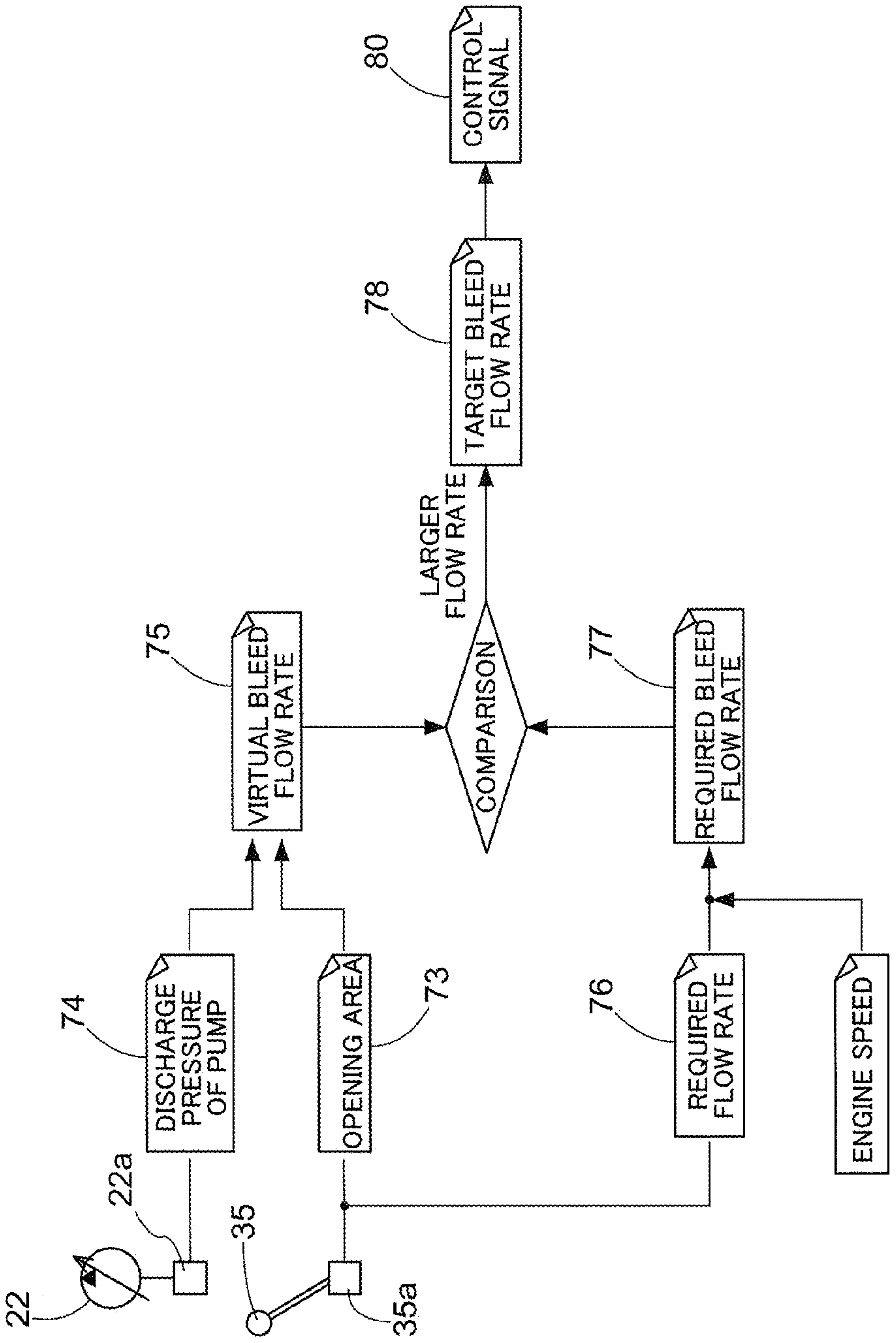
FIG. 3 is a diagram illustrating an example of a data flow in control of a hydraulic circuit.

When the operation lever 35, configured to be operable in the front-rear and left right directions, is operated, the control valves 10 and 11 are operated to switch the supply and discharge state of the hydraulic oil supplied from the hydraulic pump 22, while the angle of the swash plate of the hydraulic pump 22 is adjusted by a control signal 80 (see FIG. 3). When the operation lever 35 is operated in the front-rear direction, the control valve 10 is operated, and when the operation lever 35 is operated in the left-right direction, the control valve 11 is operated.

The control valve unit 8 is provided with oil passages 26, oil passages 28, oil passages 29, oil passages 30, an oil passage 41, an oil passage 42, an oil passage 43, and an oil passage 44.

The oil passages 26 are connected between the control valves 10 and 11 and the pump port 20. The oil passages 28 are connected between the control valves 10 and 11 and the tank port 24.

The oil passage 41 is connected between the control valve 10 and the first port 31, and the oil passage 42 is connected between the control valve 10 and the second port 32. The oil passage 43 is connected between the control valve 11 and the third port 33, and the oil passage 44 is connected between the control valve 11 and the fourth port 34.

The oil passages 29 are connected between the oil passage 41 and the oil passages 28 and between the oil passage 42 and the oil passages 28, and relief valves 19 and check valves 21 are provided in the oil passages 29. The oil passages 30 are connected between the oil passage 43 and the oil passages 28 and between the oil passage 44 and the oil passages 28, and relief valves 19 and check valves 21 are provided in the oil passages 30.

Outside the control valve unit 8, hydraulic hoses 37 are connected between the first port 31 and a bottom-side oil chamber 17*a* of a boom cylinder 17 and between the second port 32 and a rod-side oil chamber 17*b* of the boom cylinder 17. Hydraulic hoses 38 are connected between the third port 33 and a rod-side oil chambers 18*a* of a bucket cylinder 18 and between the fourth port 34 and a bottom-side oil chamber 18*b* of the bucket cylinder 18.

Hereinafter, a configuration for controlling the operation of the boom cylinders 17 and the bucket cylinders 18 using the hydraulic oil discharged from the transmission case 23 by the hydraulic pump 22, with the control valve unit 8 described above, will be described with reference to FIG. 2.

Operation States of Control Valves of Each Boom Cylinder

The state shown in FIG. 2 is a state in which the control valve 10 is operated to the neutral position 10N. In this state, the oil passages 41 and 42 are blocked by the control valve 10 at the neutral position 10N, hydraulic oil is not supplied from the hydraulic pump 22 to the boom cylinder 17, and the boom cylinder 17 stops.

When the control valve 10 is operated to the first position 10U, the hydraulic oil supplied from the transmission case 23 to the oil passages 26 by the hydraulic pump 22 passes through the first position 10U of the control valve 10, and is supplied to the oil chamber 17*a* of the boom cylinder 17 via the oil passage 41, the first port 31, and the hydraulic hose 37. At the same time, the hydraulic oil in the oil chamber 17*b* of the boom cylinder 17 is discharged through the hydraulic hose 37, the second port 32, the oil passage 42, the first position 10U of the control valve 10, the oil passage 28, and the tank port 24 to the transmission case 23.

As a result, the boom cylinder 17 is extended, and the boom 15 is raised. When the load on the boom cylinder 17 increases and the pressure in the oil passage 41 exceeds a set value, the relief valve 19 in the oil passage 29 is operated to the open position to discharge hydraulic oil, thereby reducing the load on the boom cylinder 17.

When the control valve 10 is operated to the second position 10D, the hydraulic oil supplied from the transmission case 23 to the oil passages 26 by the hydraulic pump 22 passes through the second position 10D of the control valve 10, and is supplied to the oil chamber 17*b* of the boom cylinder 17 via the oil passage 42, the second port 32, and the hydraulic hose 37. At the same time, the hydraulic oil in the oil chamber 17*a* of the boom cylinder 17 is discharged through the hydraulic hose 37, the first port 31, the oil passage 41, the second position 10D of the control valve 10, the oil passage 28, and the tank port 24 to the transmission case 23. As a result, the boom cylinder 17 retracts and the boom 15 is lowered.

When the control valve 10 is operated to the third position 10F, the oil passages 26 and the oil passages 28 are connected at the third position 10F of the control valve 10, and the oil passages 41 and 42 and the oil passages 28 are connected. As a result, the boom cylinder 17 is placed in a floating state in which the boom cylinder 17 can freely extend and retract.

Operation States of Control Valves of Each Bucket Cylinder

The state shown in FIG. 2 is a state in which the control valve 11 is operated to the neutral position 11N. In this state, the oil passages 43 and 44 are blocked by the control valve 11 at the neutral position 11N, hydraulic oil is not supplied from the hydraulic pump 22 to the bucket cylinder 18, and the bucket cylinder 18 stops.

When the control valve 11 is operated to the first position 11U, the hydraulic oil supplied from the transmission case 23 to the oil passages 26 by the hydraulic pump 22 passes through the first position 11U of the control valve 11, and is supplied to the oil chamber 18*a* of the bucket cylinder 18 via the oil passage 43, the third port 33, and the hydraulic hose 38. At the same time, the hydraulic oil in the oil chamber 18*b* of the bucket cylinder 18 is discharged through the hydraulic hose 38, the fourth port 34, the oil passage 44, the first position 11U of the control valve 11, the oil passage 28, and the tank port 24 to the transmission case 23.

As a result, the bucket cylinder 18 is contracted, and the bucket 16 is raised (scoop operation). When the load on the bucket cylinder 18 increases and the pressure in the oil passage 43 exceeds a set value, the relief valves 19 in the oil passage 30 is operated to the open position to discharge hydraulic oil, thereby reducing the load on the bucket cylinder 18.

When the control valve 11 is operated to the second position 11H, the hydraulic oil supplied from the transmission case 23 to the oil passages 26 by the hydraulic pump 22 passes through the second position 11H of the control valve 11, and is supplied to an oil chamber 18*b* of the bucket cylinder 18 via the oil passage 44, the fourth port 34, and the hydraulic hose 38. When the control valve 11 is in the second position 11H, the oil passage 43 and the oil passage 44 are connected to each other.

As a result, the bucket cylinder 18 is extended at a relatively high speed, and the bucket 16 is lowered (dump operation) at a relatively high speed. When the load on the bucket cylinder 18 increases and the pressure in the oil passage 44 exceeds a set value, the relief valves 19 in the oil passages 30 are operated to the open position, thereby reducing the load on the bucket cylinder 18.

When the control valve 11 is operated to the third position 11D, the hydraulic oil supplied from the transmission case 23 to the oil passages 26 by the hydraulic pump 22 passes through the third position 11D of the control valve 11, and is supplied to the oil chamber 18*b* of the bucket cylinder 18 via the oil passage 44, the fourth port 34, and the hydraulic hose 38. At the same time, the hydraulic oil in the oil chamber 18*a* of the bucket cylinder 18 is discharged through the hydraulic hose 38, the third port 33, the oil passage 43, the third position 11D of the control valve 11, the oil passage 28, and the tank port 24 to the transmission case 23.

As a result, the bucket cylinder 18 is extended, and the bucket 16 is lowered (dump operation). When the load on the bucket cylinder 18 increases and the pressure in the oil passage 44 exceeds a set value, the relief valves 19 in the oil passages 30 are operated to the open position, thereby reducing the load on the bucket cylinder 18.

Overview of Hydraulic Circuit Control

Figure 4:
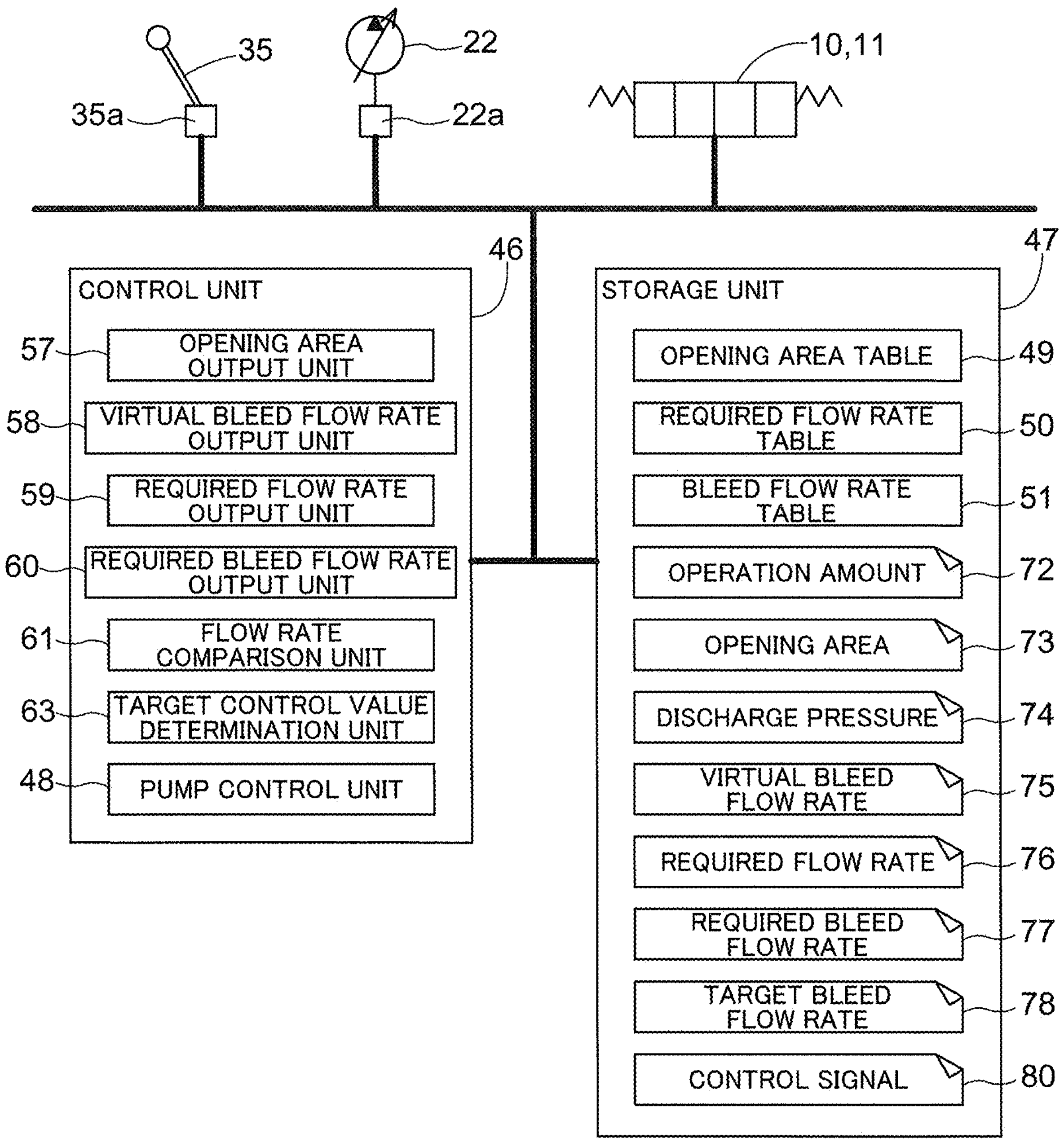
FIG. 4 is a diagram illustrating an example of a configuration of a control device for the hydraulic circuit.

An overview of the hydraulic circuit control will be described using FIGS. 3 and 4 with reference to FIG. 2.

The control valve unit 8, which is a hydraulic circuit, is controlled by a hydraulic circuit control device (hydraulic control device). The hydraulic circuit control device controls the control valves 10 and 11 of the control valve unit 8 and the angle of the swash plate of the hydraulic pump 22 in response to the operation received by the operation lever 35. The hydraulic circuit control device outputs a control signal 80 to adjust the angle of the swash plate of the hydraulic pump 22 to control the discharge flow rate of hydraulic oil discharged from the hydraulic pump 22, and also hydraulically controls the boom cylinders 17 and the bucket cylinders 18 by controlling the operation of the control valves 10 and 11 (adjusting the volume of hydraulic oil supplied).

That is, the hydraulic pump 22 discharges (supplies) hydraulic oil to hydraulically control the boom cylinders 17 and the bucket cylinders 18 (hereinafter, these cylinders may also be collectively referred to simply as hydraulic actuators). The control valves 10 and 11 of the control valve unit 8 adjust the hydraulic oil supplied from the hydraulic pump 22 to the hydraulic actuators. At this time, a bleed-off control is performed to adjust the discharge volume of hydraulic oil discharged from the hydraulic pump 22, considering the discharge volume of hydraulic oil (bleed flow rate) to be returned (discharged) to the transmission case 23 via a virtual bleed circuit that is a discharge oil passage and is assumed to connect the control valves 10 and 11 and the hydraulic oil tank with a bypass line. In addition, a table describing the correspondence relationship between a virtual bleed flow rate 75 or a virtual bleed differential pressure 81 (see FIG. 6) and the pump displacement is set in advance, thereby determining the relationship between the virtual bleed flow rate 75 or the virtual bleed differential pressure 81 and the pump displacement. The hydraulic pump 22 adjusts the volume of hydraulic oil discharged based on this relationship.

The operation lever 35 is provided with an operation amount sensor 35*a* that detects an operation amount 72 (operation position) when the operation lever 35 is operated. The hydraulic pump 22 is provided with a discharge pressure sensor 22*a* that detects the discharge pressure 74 of the hydraulic oil being discharged. The hydraulic circuit control device includes a control unit 46, which outputs a target pump flow rate 86 (see FIG. 10) for the hydraulic actuators taking into account the bleed flow rate in accordance with the operation amount 72 of the operation lever 35, and generates a control signal 80 in accordance with the target pump flow rate 86 to control the angle of the swash plate of the hydraulic pump 22. In addition, the control unit 46 determines the amount of movement of the control valve 10 or 11 depending on the operation position of the operation lever 35. The control unit 46 controls the control valve 10 or 11 by outputting a signal corresponding to the amount of movement of the control valve 10 or 11.

The control unit 46 outputs virtual bleed information such as the virtual bleed flow rate 75 (the virtual bleed information output step). The virtual bleed information is information indicating the state of the hydraulic oil flowing through the virtual bleed circuit, and is output using, for example, the discharge pressure 74 and the characteristics of the virtual bleed circuit (virtual bleed characteristics), and is obtained taking into account the bleed flow rate. The virtual bleed information is output using the discharge pressure 74 of the hydraulic oil discharged from the hydraulic pump 22, and is therefore information that takes into account the load (pressure) in the oil passage (hydraulic circuit) in a loaded state. The control unit 46 outputs required bleed information such as a required bleed flow rate 77 (the required bleed information output step). The required bleed information indicates the state of the hydraulic oil flowing through the virtual bleed circuit that is required to cause the hydraulic actuators to perform the desired operation based on the operation amount 72. That is to say, the required bleed information is information that is output from the operation amount 72 and is determined by taking into account the actual flow rate of the hydraulic oil required to operate the hydraulic actuators, taking into account the bleed flow rate. The control unit 46 compares the virtual bleed information with the required bleed information (the comparison step), determines a target control value based on the comparison result, and generates a control signal 80 in accordance with the target control value (the target control value determination step). The control unit 46 controls the hydraulic pump 22 in response to the control signal 80 (target control value) (the pump control step). Note that the virtual bleed information is output by, for example, a virtual bleed information output unit, and the required bleed information is output by, for example, a required bleed information output unit.

Generally, in the case of a pump circuit that is bleed-controlled, the operating speed of the boom cylinders 17 or the bucket cylinders 18 may vary depending on the load condition.

According to the present embodiment, the virtual bleed information is compared with the required bleed information, and the control signal 80 that takes into account the load state is generated based on the comparison result. As a result, it is possible to change the characteristics of the discharge flow rate of the hydraulic oil discharged from the hydraulic pump 22 based on the load state. That is to say, when the load is small, the hydraulic pump 22 can discharge hydraulic oil at a discharge flow rate that is based on a required flow rate 76 corresponding to the operation amount 72 of the operation lever 35. When the load is large, the discharge flow rate discharged from the hydraulic pump 22 can be reduced based on the load.

When the load is small, the control signal 80 is generated based on the required flow rate 76 corresponding to the operation amount 72 without depending on the discharge pressure 74, so that the operation speed is stable and operability is improved. When the load is large, the pump discharge flow rate is reduced based on the load, so that the operating speeds of the boom cylinders 17 and the bucket cylinders 18 are suppressed.

Hydraulic Circuit Control

Next, a specific hydraulic circuit control device and a specific hydraulic circuit control method will be described using FIGS. 3 to 5 with reference to FIG. 2.

The hydraulic circuit control device includes the control unit 46 and a storage unit 47, and is connected to the operation amount sensor 35*a* of the operation lever 35, the discharge pressure sensor 22*a* of the hydraulic pump 22, the hydraulic pump 22, the control valve 10, and the control valve 11 so as to be capable of performing data communication. The operation amount sensor 35*a* detects the operation amount 72 (operation position) of the operation lever 35, and stores the operation amount 72 in the storage unit 47. The discharge pressure sensor 22*a* detects the discharge pressure 74 of the hydraulic pump 22 and stores the discharge pressure 74 in the storage unit 47. Note that the control device may be provided as a single device, or a part or the whole of the control device may be provided in the operation lever 35 or the hydraulic pump 22.

The storage unit 47 stores various tables indicating a given correspondence relationship created in advance and various values (information and acquired and output values). The amount of hydraulic oil (the required flow rate 76) to be discharged from the hydraulic pump 22 in response to the operation amount 72 of the operation lever 35 can be predicted in advance taking the bleed flow rate into consideration. An opening area 73 of the virtual bleed circuit (virtual bypass opening area) is the opening area of a virtual control valve provided on the inlet side of the virtual bleed circuit (closer to the hydraulic pump 22 side than a virtual throttle resistance, which will be described later), and the bleed flow rate is determined by the opening area 73 and the differential pressure conditions before and after the virtual throttle resistance. In addition, the virtual bleed differential pressure 81 (see FIG. 6), which is a differential pressure across the virtual throttle resistance provided on the outlet side of the virtual bleed circuit (closer to the hydraulic oil tank than the virtual control valve), is also determined based on the bleed flow rate. Note that the virtual throttle resistance may be a fixed throttle resistance with a constant opening area 73, or may be a variable throttle resistance with a variable opening area 73. Taking the above into consideration, various tables are determined in advance and stored in the storage unit 47. Note that the storage unit 47 is not limited to storing various tables, and may store information indicating a given correspondence relationship instead of at least some of the tables. The control unit 46 may also operate using information indicating a given correspondence relationship instead of the various tables described below.

In an opening area table 49 stored in the storage unit 47, the correspondence relationship between the opening area 73 of the virtual bleed circuit and the operation amount 72 corresponding to the operation lever 35 is described. A required flow rate table 50 stored in the storage unit 47 describes the correspondence relationship between the required flow rate 76 and the operation amount 72, the required flow rate 76 being the flow rate of hydraulic oil that takes into account the bleed flow rate discharged from the hydraulic pump 22 and that is required to be supplied to the hydraulic actuators to cause the hydraulic actuators to perform the desired operation based on the operation amount 72. Since a bleed flow rate table 51 stored in the storage unit 47 describes the correspondence relationship between the pump displacement and the bleed flow rate, the required flow rate 76 is output as the required pump displacement based on the rotation speed of the pump drive source (such as the engine 4 or an electric motor).

The control unit 46 in the present embodiment includes a pump control unit 48, an opening area output unit 57, a virtual bleed flow rate output unit 58, a required flow rate output unit 59, a required bleed flow rate output unit 60, a flow rate comparison unit 61, and a target control value determination unit 63. The respective functions may be integrated into the target control value determination unit 63.

Figure 5:
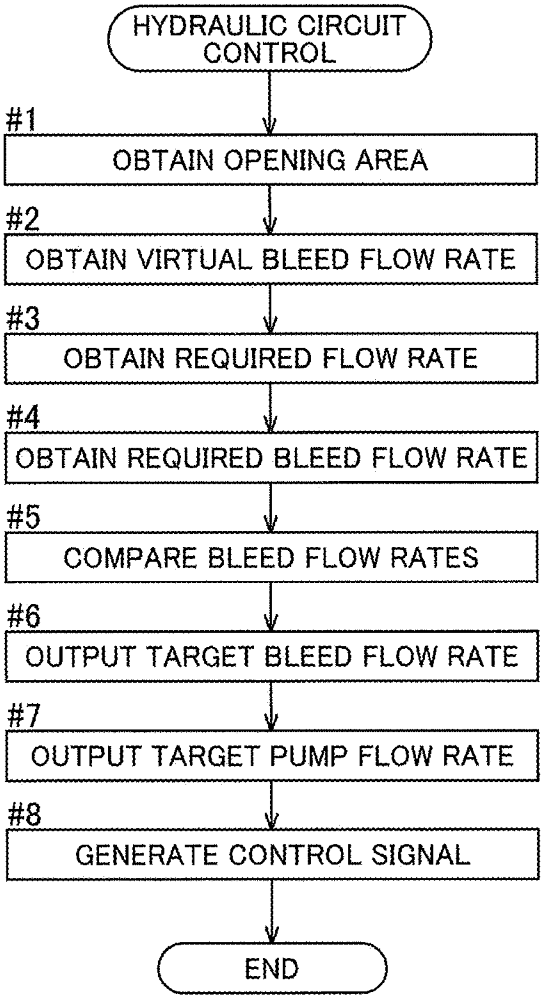
FIG. 5 is a diagram illustrating a control flow of the hydraulic circuit.

The opening area output unit 57 determines the opening area 73 based on the detected operation amount 72 corresponding to the operation lever 35 based on the opening area table 49 (step #1 in FIG. 5, the opening area output step).

The virtual bleed flow rate output unit 58, which is an example of the virtual bleed information output unit, outputs the virtual bleed flow rate 75, which is the flow rate of hydraulic oil flowing through the virtual bleed circuit, as virtual bleed information, based on the opening area 73 and the discharge pressure 74 (step #2 in FIG. 5, the virtual bleed flow rate output step).

For example, the virtual bleed flow rate 75 is output from Equation (1), where Q denotes the virtual bleed flow rate 75.

[Math. 1]

$$Q = CA\sqrt{\frac{2(Pd - Pn)}{\rho}} \qquad \text{Equation (1)}$$

In Equation (1), C is a flow coefficient of the virtual bleed circuit, which is determined in advance in the hydraulic circuit. A corresponds to the opening area 73 and Pd corresponds to the discharge pressure 74. Pn is the virtual bleed differential pressure 81 (see FIG. 6) that corresponds to the back pressure generated due to the virtual throttle resistance set at the virtual bleed circuit outlet, and is output based on a table that is determined in advance based on the operation amount 72, the required bleed flow rate 77, which will be described later, and so on. ρ is the density of the hydraulic oil.

Here, the virtual bleed flow rate 75 takes into account the opening area 73, the discharge pressure 74, and the virtual bleed differential pressure 81, and therefore the load condition of the hydraulic circuit is taken into account. The discharge pressure 74 corresponds to the actual pump pressure of the hydraulic pump 22. Note that the virtual bleed flow rate 75 is not limited to being output from the opening area 73 and the discharge pressure 74, but may be output using a table indicating the correspondence relationship between the opening area 73, the discharge pressure 74, and the virtual bleed flow rate 75.

The required flow rate output unit 59 determines the required flow rate 76 corresponding to the detected operation amount 72 of the operation lever 35 based on the required flow rate table 50 (step #3 in FIG. 5, the required flow rate output step). The required flow rate 76 is determined based on the operation amount 72 of the operation lever 35, and is a flow rate determined in advance in association with the operation amount 72 as the flow rate of hydraulic oil that takes into account the bleed flow rate discharged from the hydraulic pump 22.

The required bleed flow rate output unit 60, which is an example of the required bleed information output unit, obtains the required bleed flow rate 77 from the required flow rate 76 obtained by the required flow rate output unit 59 based on the bleed flow rate table 51 (step #4 in FIG. 5, the required bleed flow rate output step). The required bleed flow rate 77 is the flow rate of hydraulic oil that is required to flow through the virtual bleed circuit in order to cause the hydraulic actuators to perform the desired operation based on the operation amount 72. The required bleed flow rate 77 corresponds to a flow rate defined as a bleed flow rate when hydraulic oil is discharged from the hydraulic pump 22 at the required flow rate 76. Although the required bleed flow rate 77 is obtained using the required flow rate table 50 and the bleed flow rate table 51, the required bleed flow rate 77 may be obtained based on the operation amount 72 using a table in which the correspondence relationship between the operation amount 72 and the required bleed flow rate 77 is predetermined.

The flow rate comparison unit 61 compares the virtual bleed flow rate 75 with the required bleed flow rate 77 (step #5 in FIG. 5, the bleed flow rate comparison step), and outputs the larger flow rate as the target bleed flow rate 78 (step #6 in FIG. 5, the target bleed flow rate output step).

The target control value determination unit 63 outputs a target pump flow rate corresponding to the target bleed flow rate 78 based on the bleed flow rate table 51 as the control signal 80 so that the hydraulic oil is discharged from the hydraulic pump 22 and supplied to the boom cylinders 17 and the bucket cylinders 18 (#7, the control signal output step).

The angle of the swash plate of the hydraulic pump 22 is controlled using the pump control unit 48 based on the target pump flow rate 86, which is the control signal 80.

In this way, by comparing the virtual bleed flow rate 75, which is virtual bleed information, with the required bleed flow rate 77, which is required bleed information, to determine the target bleed flow rate 78 and generate the control signal 80, when the load is small, it is possible to cause the hydraulic pump 22 to discharge hydraulic oil at the discharge flow rate that is based on the required flow rate 76, which corresponds to the operation amount 72 of the operation lever 35. When the load is large, the discharge flow rate discharged from the hydraulic pump 22 can be reduced based on the load. As a result, it is possible to supply a flow rate corresponding to the lever operation amount and realize an appropriate operation speed to improve operability. In addition, under a load condition where the virtual bleed flow rate 75 is equal to or greater than the required bleed flow rate 77, the operating speeds of the boom cylinders 17 and the bucket cylinders 18 are suppressed.

Pump Control Command Pressure Output Unit

Figure 12:
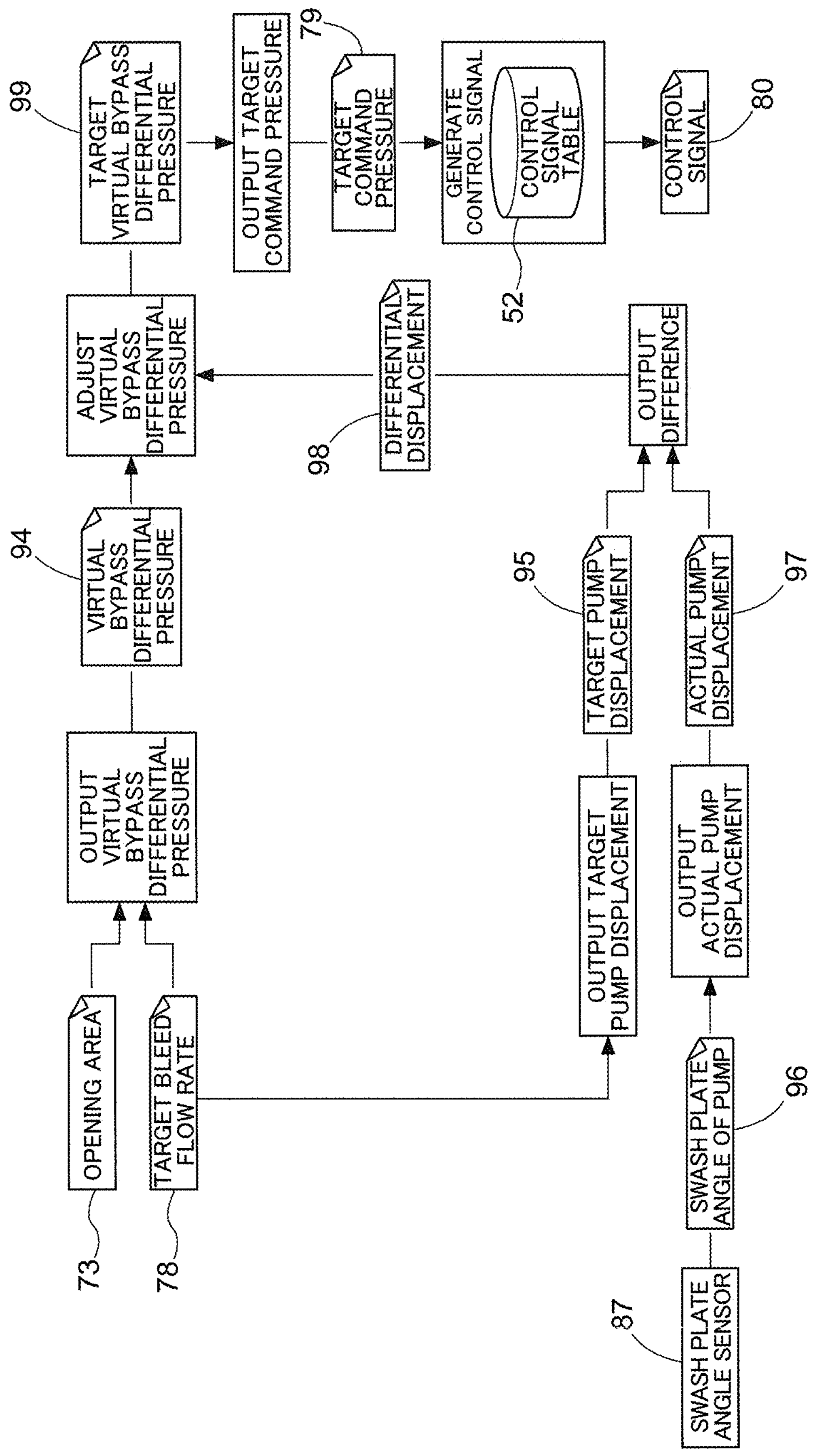
FIG. 12 is a diagram illustrating a data flow in output of a target command pressure.
Figure 13:
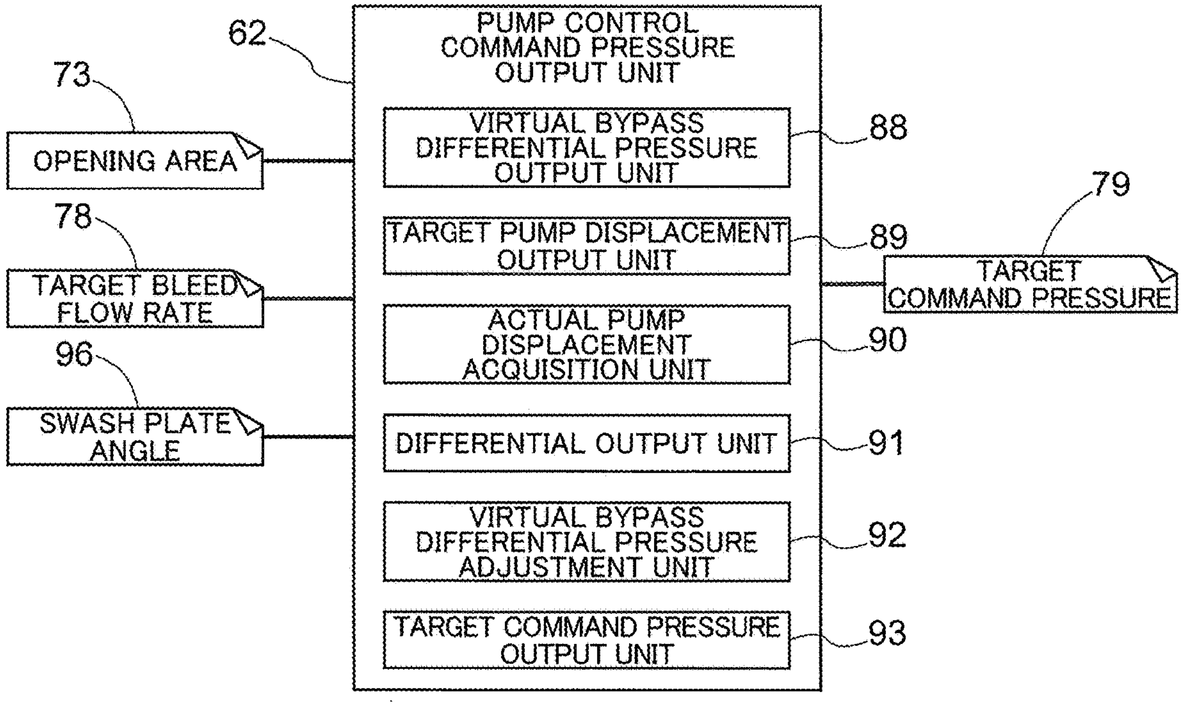
FIG. 13 is a diagram illustrating a configuration for outputting the target command pressure.

Next, a specific example of a pump control command pressure output unit 62 will be described using FIGS. 12 to 14 with reference to FIGS. 2 and 4.

Figure 14:
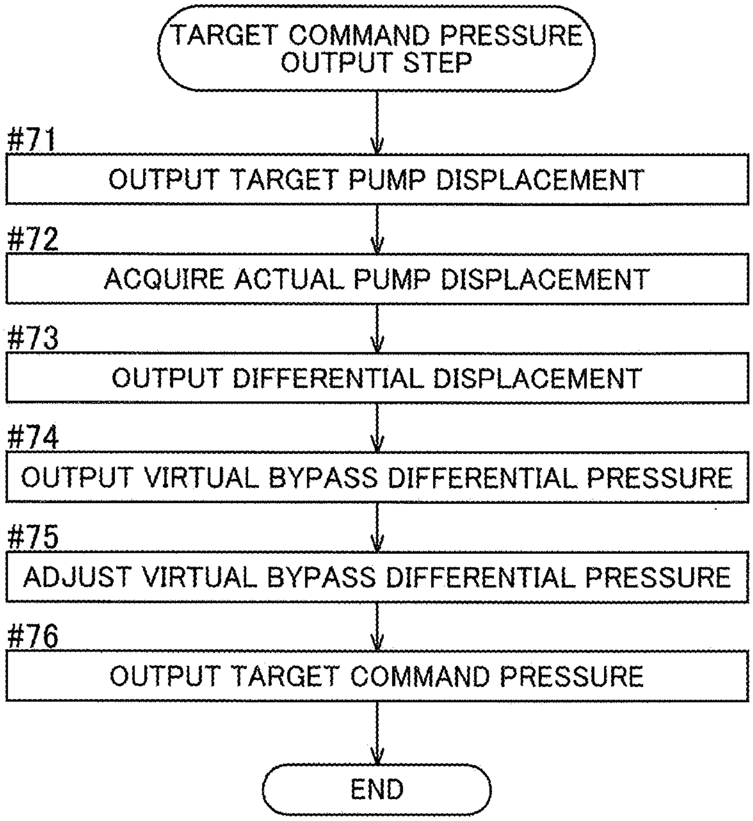
FIG. 14 is a diagram illustrating an output flow of the target command pressure.

A target pump displacement output unit 89 outputs a target pump displacement 95 based on the target bleed flow rate 78 (step #71 in FIG. 14, the target pump displacement output step). The target pump displacement 95 is the pump displacement of the hydraulic pump 22 when an appropriate discharge flow rate of hydraulic oil is supplied from the hydraulic pump 22 as a result of bleed-off control. The pump control unit 48 may also control the hydraulic pump 22 so that the displacement of the hydraulic pump 22 approaches the target pump displacement 95.

An actual pump displacement acquisition unit 90 outputs an actual pump displacement 97 based on a swash plate angle 96 of the hydraulic pump 22 detected by a swash plate angle sensor 87 (step #72 in FIG. 14, the actual pump displacement acquisition step). The hydraulic pump 22 includes the swash plate angle sensor 87, and the swash plate angle 96 is detected by the swash plate angle sensor 87. The swash plate angle 96 is the angle of the swash plate of the hydraulic pump 22, and the pump volume (pump displacement) of the hydraulic pump 22 is changed by changing the angle of the swash plate, and the hydraulic pump 22 discharges hydraulic oil at a discharge flow rate corresponding to the pump displacement. Therefore, if the swash plate angle 96 is known, the pump displacement of the hydraulic pump 22 is uniquely determined. Note that the actual pump displacement 97 may be output from the swash plate angle 96, but the actual pump displacement 97 may also be acquired using any method.

A differential output unit 91 outputs a differential displacement 98, which is the difference between the target pump displacement 95 and the actual pump displacement 97 (step #73 in FIG. 14, the differential output step). Note that the pump control unit 48 may control the hydraulic pump 22 so as to reduce the differential displacement 98.

When the angle of the swash plate is controlled based on the target pump flow rate 86, which is the target control value, the pump control command pressure output unit 62 corrects the pump control command pressure, output using a given method, based on the differential displacement 98 between the actual pump displacement 97 and the target pump displacement 95, and outputs it as a new pump control command pressure.

The opening area 73, the target bleed flow rate 78, and the swash plate angle 96 are input to the pump control command pressure output unit 62, and the pump control command pressure output unit 62 outputs a target command pressure 79.

The pump control command pressure output unit 62 includes a virtual bypass differential pressure output unit 88, the target pump displacement output unit 89, the actual pump displacement acquisition unit 90, the differential output unit 91, a virtual bypass differential pressure adjustment unit 92, and a target command pressure output unit 93.

The virtual bypass differential pressure output unit 88 outputs a virtual bypass differential pressure 94 based on the opening area 73 and the target bleed flow rate 78 (step #74 in FIG. 14, the virtual bypass differential pressure output step). The virtual bypass differential pressure 94 is the pressure of the hydraulic oil that is virtually discharged (bled) from the hydraulic circuit during bleed-off control. Specifically, the virtual bypass differential pressure 94 is output based on the following Equation (2), where ΔP denotes the virtual bypass differential pressure 94.

[Math. 2]

$$\Delta P = \rho \frac{Q^2}{2C^2 A^2} \qquad \text{Equation (2)}$$

The virtual bypass differential pressure adjustment unit 92 adjusts the virtual bypass differential pressure 94, using the differential displacement 98, and outputs a target virtual bypass differential pressure 99 (step #75 in FIG. 14, the virtual bypass differential pressure adjustment step). Specifically, the virtual bypass differential pressure adjustment unit 92 corrects the virtual bypass differential pressure 94 by performing feedback control on the virtual bypass differential pressure 94, using the differential displacement 98. The target pump displacement 95 is the control signal 80 output from the target control value determination unit 63, and the swash plate angle 96 of the hydraulic pump 22 is set to the target swash plate angle. The actual pump displacement 97 reflects the actual swash plate angle. Therefore, the differential displacement 98 reflects the difference between the target swash plate angle and the actual swash plate angle. As a result, the target virtual bypass differential pressure 99 is a differential pressure obtained by performing feedback control on the virtual bypass differential pressure 94 so that the difference between the target swash plate angle and the actual swash plate angle is eliminated (is smaller).

The target command pressure output unit 93 outputs the target command pressure 79 based on the target virtual bypass differential pressure 99 (step #76 in FIG. 14, the target command pressure output step). Specifically, the target command pressure 79 is output by adding the virtual bleed differential pressure 81 at the virtual bleed circuit outlet generated due to the target bleed flow rate 78 to the target virtual bypass differential pressure 99. Additionally, back pressure conditions such as downstream hydraulic tank pressure may also be taken into account.

Since the target virtual bypass differential pressure 99 is a differential pressure obtained by performing feedback control on the virtual bypass differential pressure 94 based on the target swash plate angle and the actual swash plate angle, the target command pressure 79 obtained based on the target virtual bypass differential pressure 99 is a command pressure in which the deviation between the target swash plate angle and the actual swash plate angle is suppressed. As a result, by controlling the hydraulic pump 22 using the target command pressure 79, the discharge flow rate of the hydraulic oil discharged from the hydraulic pump 22 based on the operation amount 72 of the operation lever 35 is the target pump flow rate 86.

In addition, the pump control unit 48 may control the hydraulic pump 22 by correcting the discharge pressure 74 of the hydraulic pump 22 when the hydraulic pump 22 discharges hydraulic oil corresponding to the target control value (control signal 80), or the immediately preceding target command pressure 79 (hydraulic pump control command pressure), based on the difference (differential displacement 98) between the actual pump displacement 97 and the target pump displacement 95, instead of the virtual bypass differential pressure 94.

Bleed Flow Rate Table

As described above, the relationship between the pump displacement and the bleed flow rate can be set in advance using the bleed flow rate table 51. That is to say, the relationship between the pump displacement and the bleed flow rate can be adjusted as desired in advance.

Figure 15:
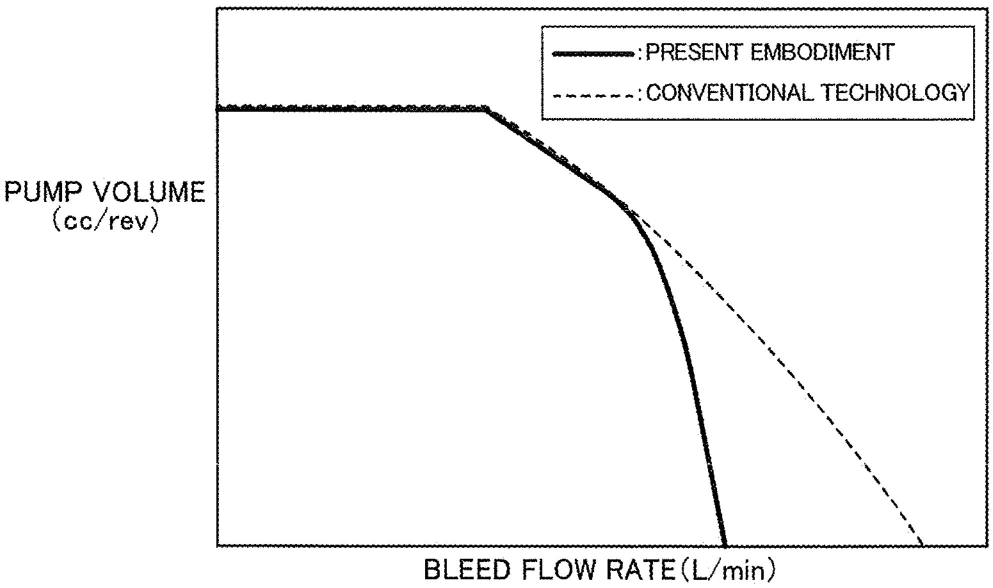
FIG. 15 is a diagram illustrating a pump flow rate in accordance with a bleed volume.

In conventional bleed-off control, the relationship between the discharge flow rate (pump displacement) actually discharged from the hydraulic pump 22 and the bleed flow rate is uniquely determined, as indicated by the dashed line in FIG. 15.

In the present embodiment, since the bleed circuit is virtualized, the flow rate characteristics of the hydraulic pump 22 for the load condition can be easily changed by adjusting the bleed flow rate table 51. It is also possible to easily change the sensitivity of the pump displacement (pump volume) to the change in the virtual bleed flow rate 75 for only a specific operation.

Modified Embodiments (1) The virtual bleed information is not limited to the virtual bleed flow rate 75 and may be the virtual bleed differential pressure 81, and the required bleed information is not limited to the required bleed flow rate 77 and may be a required bleed differential pressure 82. The virtual bleed differential pressure 81 is a pressure difference across the virtual throttle resistance set at the outlet of the virtual bleed circuit. The required bleed differential pressure 82 is a differential pressure across the virtual throttle resistance that is required to cause the hydraulic actuators to perform desired operations based on the operation amount 72.

Figure 6:
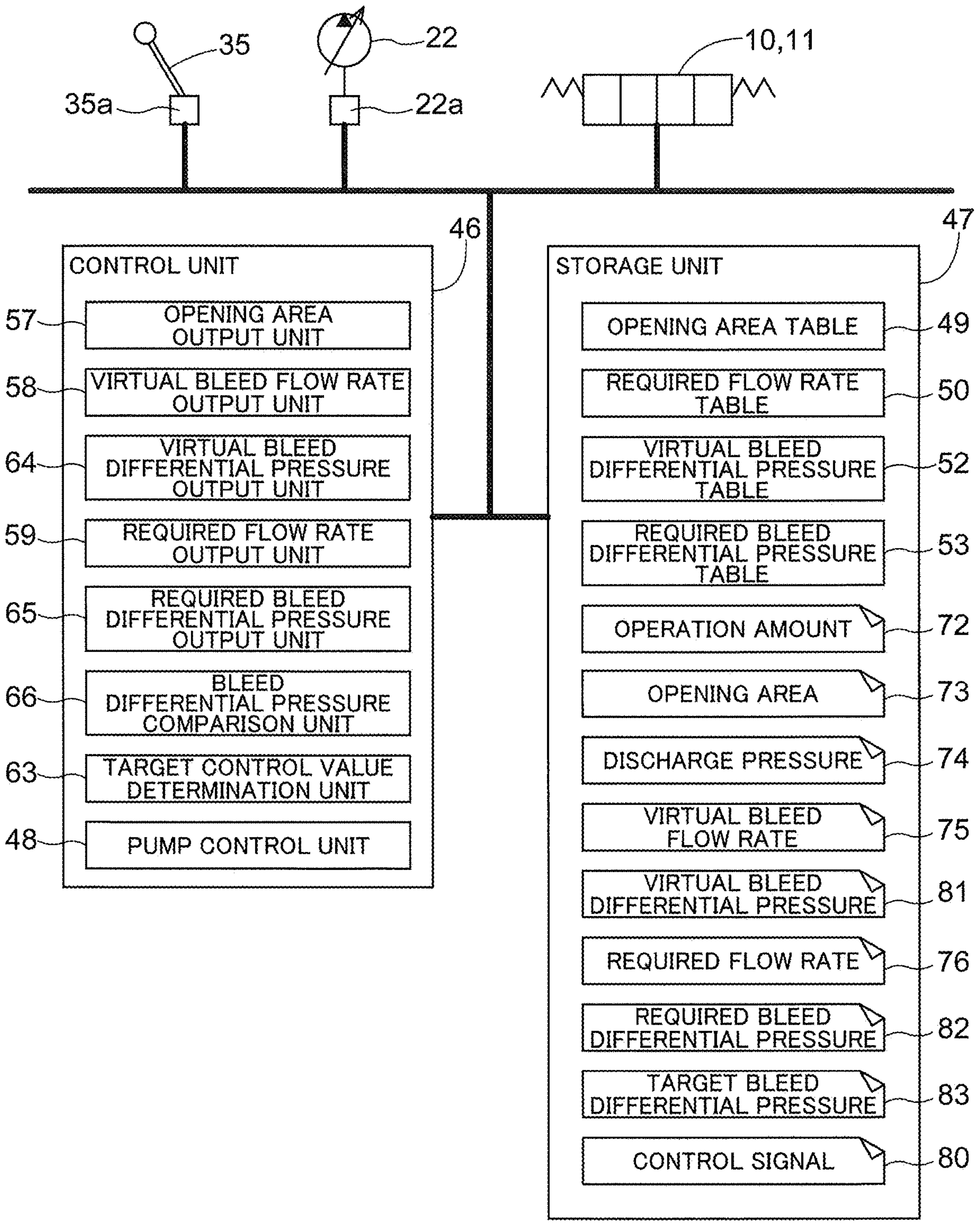
FIG. 6 is a diagram illustrating a configuration of a hydraulic circuit control device according to a modified embodiment.

Hereinafter, a hydraulic circuit control device that generates a control signal 80 by comparing the virtual bleed differential pressure 81 with the required bleed differential pressure 82 will be described using FIGS. 6 and 7 with reference to FIG. 2. Note that descriptions of the same components as in the above embodiment may be omitted.

As in the above embodiment, the hydraulic circuit control device includes the control unit 46 and the storage unit 47, and generates a control signal 80 corresponding to the operation amount 72 and the discharge pressure 74.

The storage unit 47 stores in advance the above-mentioned opening area table 49, the above-mentioned required flow rate table 50, a virtual bleed differential pressure table 52, and a required bleed differential pressure table 53 as various tables.

The virtual bleed differential pressure table 52 indicates the correspondence relationship between the virtual bleed flow rate 75 and the virtual bleed differential pressure 81. The required bleed differential pressure table 53 describes the correspondence relationship between the required flow rate 76 and the required bleed differential pressure 82. The bleed differential pressure is a differential pressure across the virtual throttle resistance of the bleed hydraulic oil. The required bleed differential pressure 82 is a differential pressure across the virtual throttle resistance of the bleed hydraulic oil, which is determined in advance considering the bleed-off control and corresponds to the operation amount 72 of the operation lever 35.

The control unit 46 includes the above-mentioned opening area output unit 57, the above-mentioned virtual bleed flow rate output unit 58, a virtual bleed differential pressure output unit 64, the above-mentioned required flow rate output unit 59, a required bleed differential pressure output unit 65, a bleed differential pressure comparison unit 66, the above-mentioned target control value determination unit 63, and the above-mentioned pump control unit 48. The functions of these units may be integrated into the target control value determination unit 63 as appropriate.

Figure 7:
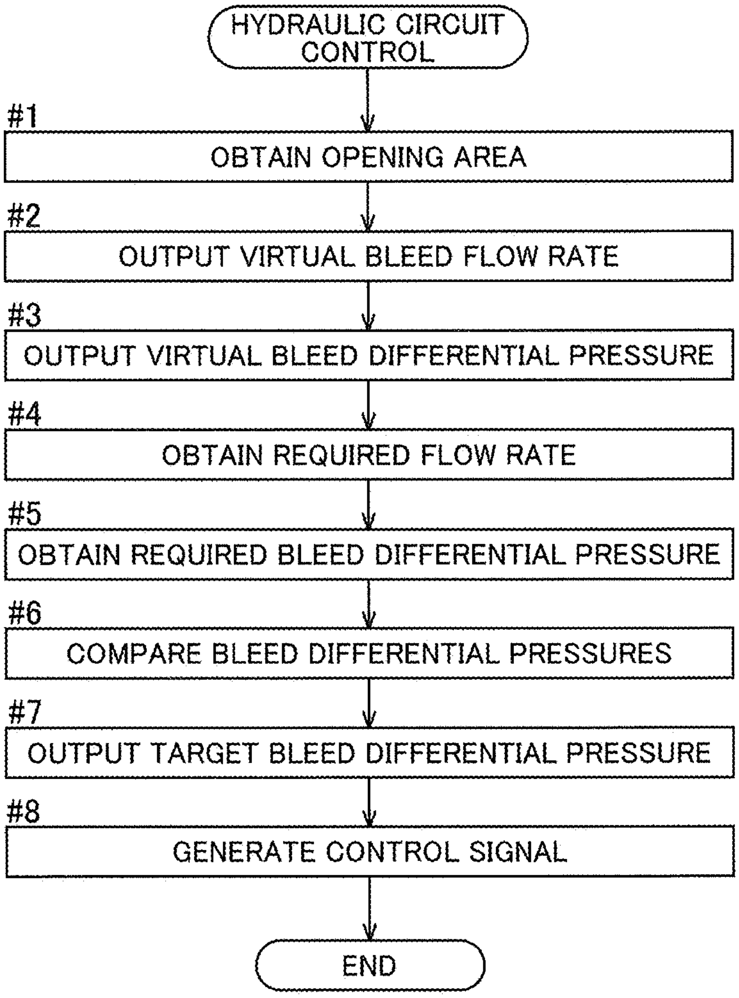
FIG. 7 is a diagram illustrating a control flow of the hydraulic circuit according to the modified embodiment.

As described above, the opening area output unit 57 determines the opening area 73 corresponding to the detected operation amount 72 of the operation lever 35 based on the opening area table 49 (step #1 in FIG. 7, the opening area output step).

As described above, the virtual bleed flow rate output unit 58 outputs the virtual bleed flow rate 75 based on the opening area 73 and the discharge pressure 74 (step #2 in FIG. 7, the virtual bleed flow rate output step). Note that the virtual bleed flow rate output unit 58 (the control unit 46) may also output the virtual bleed flow rate 75 based on the operation amount 72 and the discharge pressure 74 using a table indicating the correspondence relationship between the operation amount 72, the discharge pressure 74, and the virtual bleed flow rate 75.

The virtual bleed differential pressure output unit 64, which is an example of the virtual bleed information output unit, outputs the virtual bleed differential pressure 81 obtained based on the virtual bleed flow rate 75 as virtual bleed information (step #3 in FIG. 7, the virtual bleed differential pressure output step).

For example, the virtual bleed differential pressure output unit 64 outputs the virtual bleed differential pressure 81 based on the virtual bleed flow rate 75 using the virtual bleed differential pressure table 52 indicating the correspondence relationship between the virtual bleed flow rate 75 and the virtual bleed differential pressure 81.

The virtual bleed differential pressure 81 is a pressure difference across the virtual throttle resistance provided in the virtual bleed circuit. The virtual bleed differential pressure 81 takes into account the actual pump pressure (load condition).

As described above, the required flow rate output unit 59 obtains the required flow rate 76 based on the detected operation amount 72 corresponding to the operation lever 35, based on the required flow rate table 50 (step #4 in FIG. 7, the required flow rate output step).

The required bleed differential pressure output unit 65, which is an example of the required bleed information output unit, obtains the required bleed differential pressure 82 as the required bleed information, based on the required flow rate 76 obtained by the required flow rate output unit 59 based on the required bleed differential pressure table 53 (step #5 in FIG. 7, the required bleed differential pressure output step). The required bleed differential pressure 82 is a differential pressure across the virtual throttle resistance of the hydraulic oil bled when the hydraulic oil is discharged from the hydraulic pump 22 at the required flow rate 76. Note that the required bleed differential pressure output unit 65 (the control unit 46) may also obtain the required bleed differential pressure 82 using the required bleed flow rate 77, which is the flow rate of hydraulic oil that is required to flow through the virtual bleed circuit to cause the hydraulic actuators to perform the desired operation based on the operation amount 72, without using the required flow rate table 50 or the required bleed differential pressure table 53. In this case, the required bleed flow rate 77 may be obtained based on the operation amount 72 using a table indicating the correspondence relationship between the operation amount 72 and the required bleed flow rate 77, or obtained based on the required flow rate 76 using a table indicating the correspondence relationship between the required flow rate 76 and the required bleed flow rate 77. Thereafter, the required bleed differential pressure output unit 65 (the control unit 46) obtains the required bleed differential pressure 82 based on the required bleed flow rate 77 using a table indicating the correspondence relationship between the required bleed flow rate 77 and the required bleed differential pressure 82.

The bleed differential pressure comparison unit 66 compares the virtual bleed differential pressure 81 with the required bleed differential pressure 82 (step #6 in FIG. 7), and outputs the larger bleed differential pressure as a target bleed differential pressure 83 (step #7 in FIG. 7, the bleed differential pressure comparison step).

As described above, the target control value determination unit 63 generates the control signal 80 for controlling the angle of the swash plate of the hydraulic pump 22, based on the target bleed differential pressure 83 so that hydraulic oil corresponding to the target bleed differential pressure 83 is discharged from the hydraulic pump 22 and supplied to the boom cylinders 17 and the bucket cylinders 18 (step #8 in FIG. 7, the generation step).

The angle of the swash plate of the hydraulic pump 22 is controlled using the pump control unit 48 based on the control signal 80.

In this way, even with a configuration in which the virtual bleed differential pressure 81, which is the virtual bleed information, is compared with the required bleed differential pressure 82, which is the required bleed information, to obtain the target bleed differential pressure 83 and generate the control signal 80, as in the above embodiment, when the load is small, hydraulic oil can be discharged from the hydraulic pump 22 at a discharge flow rate that is based on the required flow rate 76 corresponding to the operation amount 72 of the operation lever 35. As a result, it is possible to supply a flow rate corresponding to the lever operation amount and realize an appropriate operation speed to improve operability. In addition, under a load condition where the virtual bleed flow rate 75 is equal to or greater than the required bleed flow rate 77, the operating speeds of the boom cylinders 17 and the bucket cylinders 18 are suppressed.

(2) The virtual bleed differential pressure 81, which is the virtual bleed information, may be obtained based on the virtual bleed flow rate 75, or may be obtained based on the discharge pressure 74 or the like.

Figure 8:
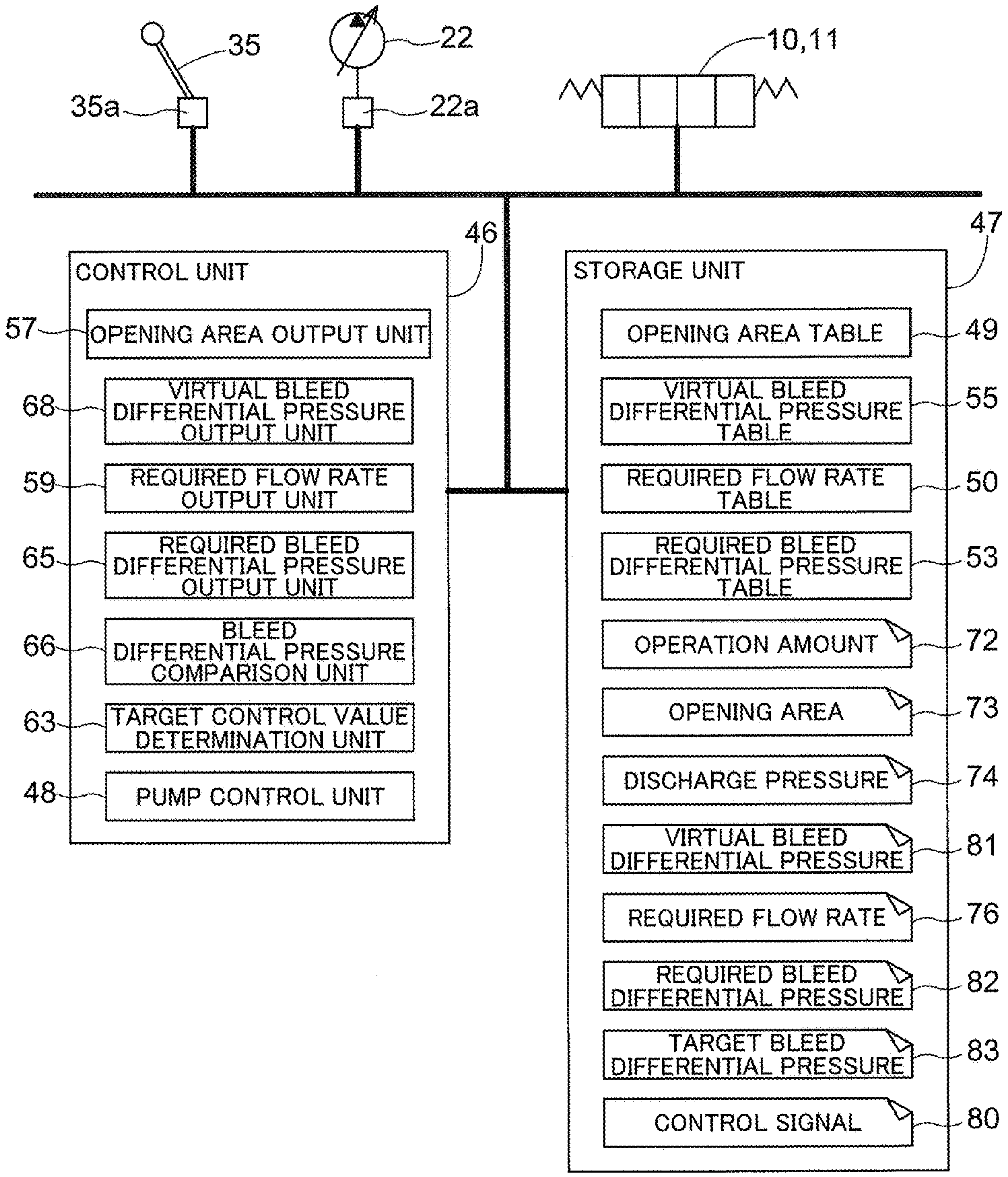
FIG. 8 is a diagram illustrating a configuration of a hydraulic circuit control device according to a modified embodiment.

Hereinafter, a hydraulic circuit control device that generates the control signal 80 by comparing the virtual bleed differential pressure 81 obtained from the discharge pressure 74 or the like with the required bleed differential pressure 82 will be described using FIGS. 8 and 9 with reference to FIG. 2. Note that the description of the same configuration as in the above embodiment or the modified embodiment (1) may be omitted.

As in the above embodiment and the modified embodiment (1), the hydraulic circuit control device includes the control unit 46 and the storage unit 47, and generates the control signal 80 based on the operation amount 72 and the discharge pressure 74.

The storage unit 47 stores in advance, as various tables, the above-mentioned opening area table 49, a virtual bleed differential pressure table 55, the above-mentioned required flow rate table 50, and the above-mentioned required bleed differential pressure table 53.

The virtual bleed differential pressure table 55 describes the correspondence relationship between the opening area 73, the discharge pressure 74, and the virtual bleed differential pressure 81. The virtual bleed differential pressure 81 is a differential pressure across a virtual throttle resistance provided in the virtual bleed circuit. The virtual bleed differential pressure 81 takes into account the actual pump pressure (load condition).

The control unit 46 includes the above-mentioned opening area output unit 57, a virtual bleed differential pressure output unit 68, the above-mentioned required flow rate output unit 59, the above-mentioned required bleed differential pressure output unit 65, the above-mentioned bleed differential pressure comparison unit 66, the above-mentioned target control value determination unit 63, and the above-mentioned pump control unit 48. The functions of these units may be integrated into the target control value determination unit 63 as appropriate.

Figure 9:
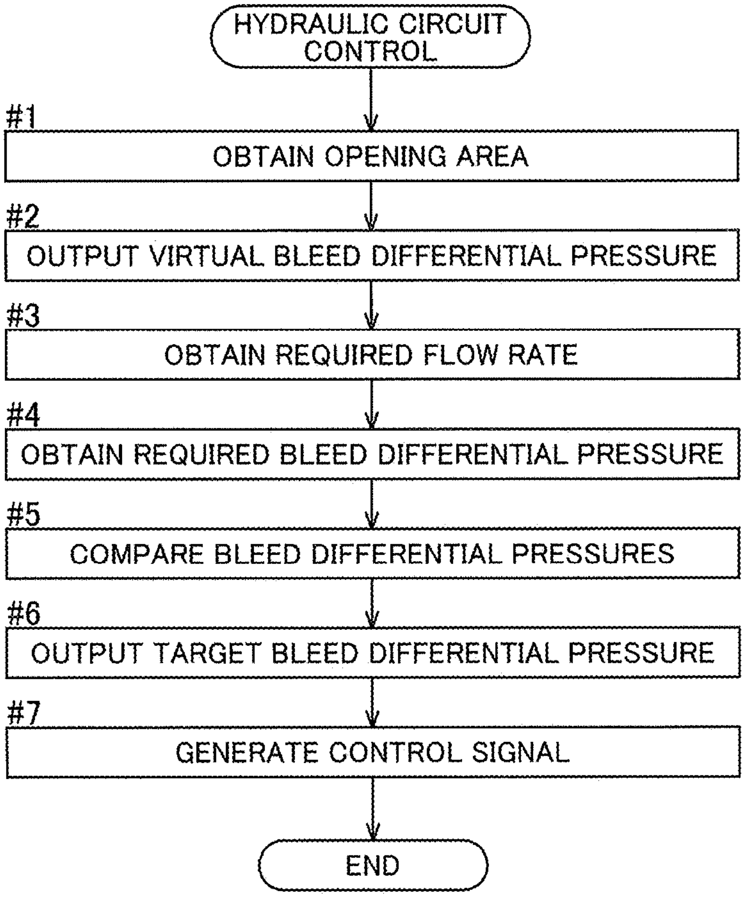
FIG. 9 is a diagram illustrating a control flow of the hydraulic circuit according to the modified embodiment.

As described above, the opening area output unit 57 determines the opening area 73 corresponding to the detected operation amount 72 of the operation lever 35 based on the opening area table 49 (step #1 in FIG. 9, the opening area output step).

The virtual bleed differential pressure output unit 68, which is an example of the virtual bleed information output unit, obtains, as the virtual bleed information, the virtual bleed differential pressure 81 corresponding to the opening area 73 obtained by the opening area output unit 57 and the discharge pressure 74, based on the virtual bleed differential pressure table 55 (step #2 in FIG. 9, the virtual bleed differential pressure output step). Note that the virtual bleed differential pressure output unit 68 (the control unit 46) may output the virtual bleed differential pressure 81 based on the operation amount 72 and the discharge pressure 74 using a table indicating the correspondence relationship between the operation amount 72, the discharge pressure 74, and the virtual bleed differential pressure 81, without using the opening area table 49 or the virtual bleed differential pressure table 55.

As described above, the required flow rate output unit 59 obtains the required flow rate 76 corresponding to the detected operation amount 72 of the operation lever 35 based on the required flow rate table 50 (step #3 in FIG. 9, the required flow rate output step).

As described above, the required bleed differential pressure output unit 65, which is an example of the required bleed information output unit, obtains the required bleed differential pressure 82 as the required bleed information from the required flow rate 76 obtained in the required flow rate output unit 59 based on the required bleed differential pressure table 53 (step #4 in FIG. 9, the required bleed differential pressure output step). Note that the required bleed differential pressure output unit 65 (the control unit 46) may output the required bleed differential pressure 82 based on the operation amount 72 using a table indicating the correspondence relationship between the operation amount 72 and the required bleed differential pressure 82, without using the required flow rate table 50 or the required bleed differential pressure table 53.

As described above, the bleed differential pressure comparison unit 66 compares the virtual bleed differential pressure 81 with the required bleed differential pressure 82 (step #5 in FIG. 9), and outputs the larger bleed differential pressure as the target bleed differential pressure 83 (step #6 in FIG. 9, the bleed differential pressure comparison step).

As described above, the target control value determination unit 63 generates the control signal 80 for controlling the angle of the swash plate of the hydraulic pump 22 based on the target bleed differential pressure 83 so that hydraulic oil corresponding to the target bleed differential pressure 83 is discharged from the hydraulic pump 22 and supplied to the boom cylinders 17 and the bucket cylinders 18 (step #7 in FIG. 9, the generation step).

The angle of the swash plate of the hydraulic pump 22 is controlled using the pump control unit 48 based on the control signal 80.

Even with a configuration in which the virtual bleed differential pressure 81, which is virtual bleed information, is compared with the required bleed differential pressure 82, which is the required bleed information, to obtain the target bleed differential pressure 83 and generate the control signal 80 as in the modified embodiment (2), hydraulic oil can be discharged from the hydraulic pump 22 at the discharge flow rate based on the required flow rate 76 corresponding to the operation amount 72 of the operation lever 35 as in the above embodiment and the modified embodiment (1) when the load is small. As a result, it is possible to supply a flow rate corresponding to the lever operation amount and realize an appropriate operation speed to improve operability. In addition, under a load condition where the virtual bleed flow rate 75 is equal to or greater than the required bleed flow rate 77, the operating speeds of the boom cylinders 17 and the bucket cylinders 18 are suppressed.

(3) The virtual bleed information may be a virtual pump flow rate 84, and the required bleed information may be a required pump flow rate 85.

Figure 10:
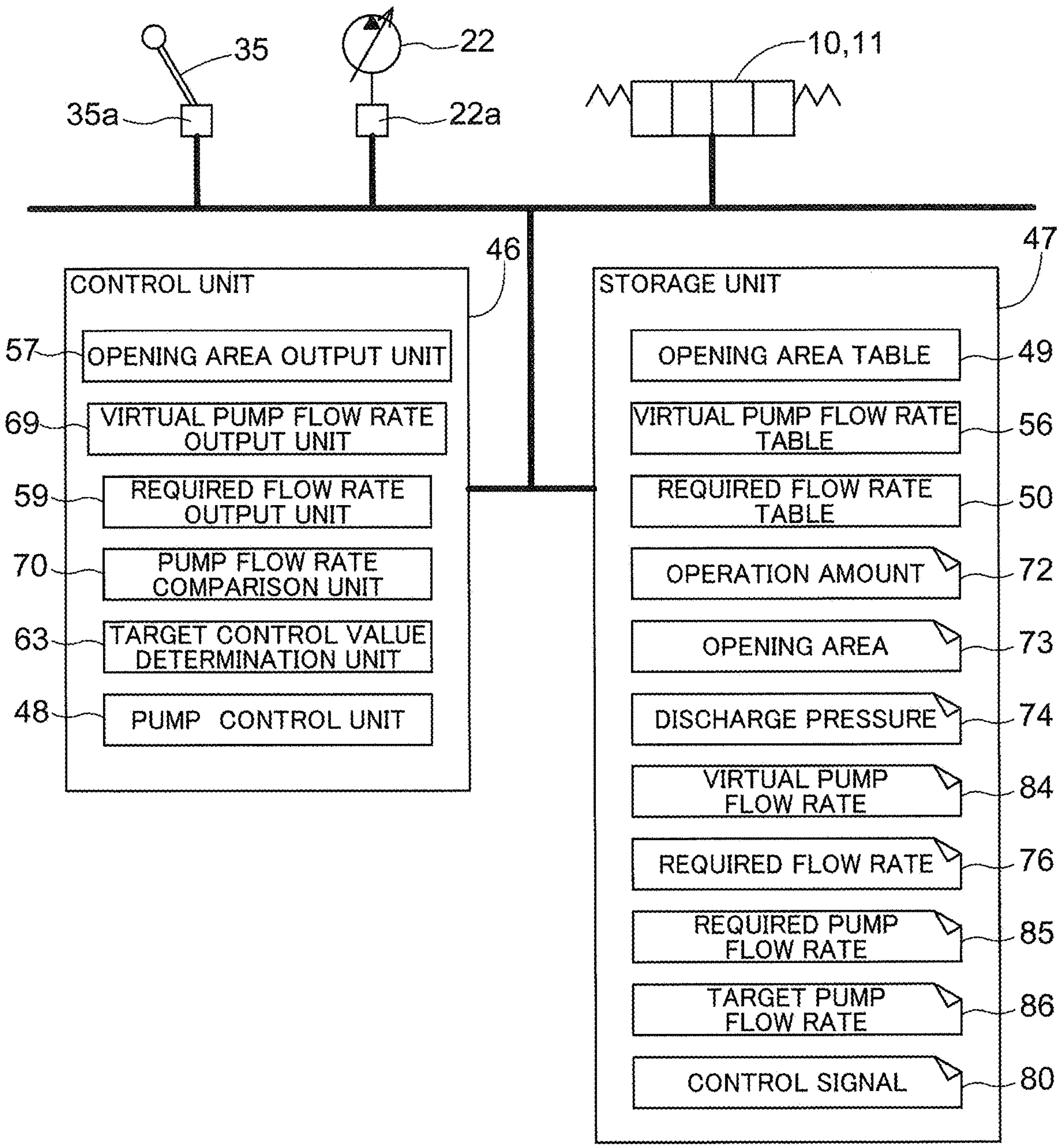
FIG. 10 is a diagram illustrating a configuration of a hydraulic circuit control device according to a modified embodiment.

Hereinafter, a hydraulic circuit control device that generates the control signal 80 by comparing the virtual pump flow rate 84 with the required pump flow rate 85 will be described using FIGS. 10 and 11 with reference to FIG. 2. Note that the description of the same configuration as in the above embodiment or the modified embodiments (1) and (2) may be omitted.

As in the above embodiment, the hydraulic circuit control device includes the control unit 46 and the storage unit 47, and generates a control signal 80 corresponding to the operation amount 72 and the discharge pressure 74.

The storage unit 47 stores in advance, as various tables, the above-mentioned opening area table 49, a virtual pump flow rate table 56, and the above-mentioned required flow rate table 50.

In the virtual pump flow rate table 56, the correspondence relationship between the opening area 73, the discharge pressure 74, and the virtual pump flow rate 84 is described. The virtual pump flow rate 84 is a pump flow rate that takes into consideration the bleed-off control corresponding to the operation amount 72 of the operation lever 35 and the actual pump pressure (load condition).

The control unit 46 includes the above-mentioned opening area output unit 57, a virtual pump flow rate output unit 69, the above-mentioned required flow rate output unit 59, a pump flow rate comparison unit 70, the above-mentioned target control value determination unit 63, and the above-mentioned pump control unit 48. The functions of these units may be integrated into the target control value determination unit 63 as appropriate.

Figure 11:
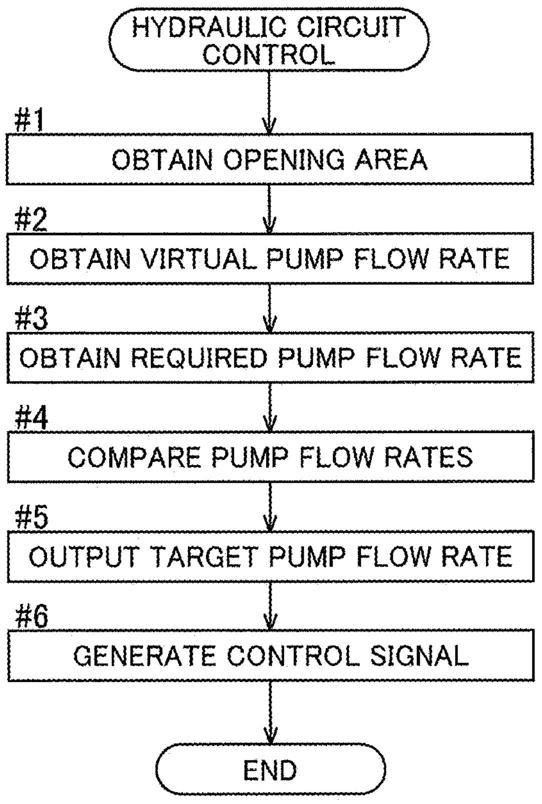
FIG. 11 is a diagram illustrating a control flow of the hydraulic circuit according to the modified embodiment.

As described above, the opening area output unit 57 obtains the opening area 73 corresponding to the detected operation amount 72 of the operation lever 35 based on the opening area table 49 (step #1 in FIG. 11, the opening area output step).

The virtual pump flow rate output unit 69, which is an example of the virtual bleed information output unit, obtains the virtual pump flow rate 84 corresponding to the opening area 73 obtained by the opening area output unit 57 and the discharge pressure 74 based on the virtual pump flow rate table 56 (step #2 in FIG. 11, the virtual pump flow rate output step). Note that the virtual pump flow rate output unit 69 (the control unit 46) may output the virtual pump flow rate 84 based on the operation amount 72 and the discharge pressure 74 by using a table indicating the correspondence relationship between the operation amount 72, the discharge pressure 74, and the virtual pump flow rate 84, which is the flow rate of hydraulic oil discharged from the hydraulic pump 22 when a virtual bleed circuit is assumed to be present, without using the opening area table 49 or the virtual pump flow rate table 56.

As described above, the required flow rate output unit 59, which is an example of the required bleed information output unit, obtains the required flow rate 76 corresponding to the detected operation amount 72 of the operation lever 35 as the required pump flow rate 85 based on the required flow rate table 50 (step #3 in FIG. 11, the required flow rate output step).

The pump flow rate comparison unit 70 compares the virtual pump flow rate 84 with the required pump flow rate 85 (step #4 in FIG. 11), and outputs the smaller flow rate as the target pump flow rate 86 (step #5 in FIG. 11, the pump flow rate comparison step).

As described above, the target control value determination unit 63 generates the control signal 80 for controlling the angle of the swash plate of the hydraulic pump 22 based on the target pump flow rate 86 so that hydraulic oil corresponding to the target pump flow rate 86 is discharged from the hydraulic pump 22 and supplied to the boom cylinders 17 and the bucket cylinders 18 (step #6 in FIG. 11, the generation step).

The angle of the swash plate of the hydraulic pump 22 is controlled using the pump control unit 48 based on the control signal 80.

In this way, even with a configuration in which the target pump flow rate 86 is obtained by comparing the virtual pump flow rate 84, which is the virtual bleed information, with the required pump flow rate 85, which is the required bleed information, to generate the control signal 80, as in the above embodiment and the modified embodiments (1) and (2), when the load is small, hydraulic oil can be discharged from the hydraulic pump 22 at the discharge flow rate based on the required flow rate 76 corresponding to the operation amount 72 of the operation lever 35. When the load is large, the discharge flow rate discharged from the hydraulic pump 22 can be reduced based on the load. As a result, it is possible to supply a flow rate corresponding to the lever operation amount and realize an appropriate operation speed to improve operability. In addition, under a load condition where the virtual bleed flow rate 75 is equal to or greater than the required bleed flow rate 77, the operating speeds of the boom cylinders 17 and the bucket cylinders 18 are suppressed.

(4) In the above modified embodiments (1) to (3), the target bleed flow rate 78 and the target command pressure 79 may be output based on the target bleed differential pressure 83 or the target pump flow rate 86, and the target control value determination unit 63 may generate the control signal 80 based on the target command pressure 79. As a result, it is possible to generate the control signal 80 and control the operation of the hydraulic pump 22 more accurately.

In addition, the flow rate may be obtained based on the swash plate angle 96 of the hydraulic pump 22, and the target pump flow rate 86 may be subjected to feedback control using this flow rate. As a result, it is possible to generate the control signal 80 more accurately.

(5) In the above embodiment or the above modified embodiments (1) to (3), the control signal 80 may be obtained based on the virtual bleed information or the required bleed information using any method.

(6) In each of the above embodiments, the configuration of the control valve unit 8 is not limited to the configuration shown in FIG. 2, as long as it is capable of controlling the supply of hydraulic oil to each hydraulic actuator.

For example, the configurations of the oil passages, the configurations of the control valves 10 and 11, and the presence or absence and configuration of each relief valve 19 can be any configuration corresponding to the configuration of the work device.

(7) In the above embodiment or each of the other embodiments, the operation lever 35 is not limited to a lever and may be an operation tool having any configuration, such as a switch. In addition, the present invention is not limited to a configuration in which one operation lever 35 (the operation tool) accepts operations performed on a plurality of hydraulic actuators, and an operation tool may be provided for each of one or a plurality of hydraulic actuators.

(8) In the above embodiment or each of the modified embodiments, the hydraulic actuators are not limited to two types, namely the boom cylinders 17 and the bucket cylinders 18, but may be one or three or more types. For example, the front loader 13 may be configured to be able to swing an arm in addition to the booms 15 and the bucket 16, and may be provided with an arm cylinder in addition to the boom cylinders 17 and bucket cylinders 18. A control valve for controlling the arm cylinder may be provided in the control valve unit 8, and this control valve may be controlled in the same manner as the control valves 10 and 11.

(9) The hydraulic actuators are not limited to actuators that operate the front loader 13, and may be configured to operate various types of work devices. In addition, work devices can be mounted on various types of equipment, in addition to work machines such as agricultural machines and construction machines.

(10) In each of the above embodiments, the information output using various tables is not limited to the format of a table, and may be output using any method based on the correspondence relationships such as those shown in the tables.

(11) In each of the above embodiments, the configuration is not limited to one in which only one virtual bleed circuit is provided, and a plurality of virtual bleed circuits may be provided. For example, a virtual bleed circuit may be provided for each actuator.

(12) In each of the above embodiments, the control unit 46 is not limited to being configured with the above-described functional blocks, and may be configured with any functional blocks. For example, each functional block of the control unit 46 may be further divided, or conversely, some or all of the functional blocks may be combined. In addition, the functions of the control unit 46 are not limited to the above-described functional blocks, and may be realized using a method executed by any functional block. In addition, some or all of the functions of the control unit 46 may be constituted by software. The program related to software is stored in a given storage device such as the storage unit 47, and is executed by a processor such as a CPU included in the control unit 46, or by a processor provided separately.

INDUSTRIAL APPLICABILITY

The present invention is applicable to the control of a hydraulic circuit that controls a hydraulic actuator that operates any work device.

DESCRIPTION OF REFERENCE SIGNS

10: Control Valve
11: Control Valve
17: Boom Cylinder (Hydraulic Actuator)
18: Bucket Cylinder (Hydraulic Actuator)
22: Hydraulic Pump
23: Transmission Case (Hydraulic Oil Tank)
35: Operation Lever (Operation Tool)
48: Pump Control Unit
63: Target Control Value Determination Unit
72: Operation Amount
73: Opening Area (A, Virtual Bypass Opening Area)
74: Discharge Pressure (Pd)
75: Virtual Bleed Flow Rate (Q, Virtual Bleed Information)
76: Required Flow Rate
77: Required Bleed Flow Rate (Required Bleed Information)
81: Virtual Bleed Differential Pressure (Virtual Bleed Information)
82: Required Bleed Differential Pressure (Required Bleed Information)
84: Virtual Pump Flow Rate (Virtual Bleed Information)
85: Required Pump Flow Rate (Required Bleed Information)
90: Actual Pump Displacement Acquisition Unit
95: Target Pump Displacement
97: Actual Pump Displacement

The invention claimed is:

1. A hydraulic control device for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the hydraulic control device comprising:

a virtual bleed information output unit that outputs virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line;

a required bleed information output unit that outputs required bleed information indicating the state of hydraulic oil flowing through the virtual bleed circuit that is required to cause the hydraulic actuator to perform a desired operation based on the operation amount;

a target control value determination unit that determines a target control value for the hydraulic pump based on a comparison result between the virtual bleed information and the required bleed information; and a pump control unit that controls the hydraulic pump based on the target control value, wherein the virtual bleed information output unit outputs a virtual bypass opening area corresponding to the operation amount based on a preset correspondence relationship between the operation amount and the virtual bypass opening area, the virtual bypass opening area being an opening area of a virtual control valve provided in the virtual bleed circuit, and outputs the virtual bleed information based on the output virtual bypass opening area and the discharge pressure, the virtual bleed information output unit outputs, as the virtual bleed information, a virtual bleed flow rate that is a flow rate of hydraulic oil flowing through the virtual bleed circuit, based on the virtual bypass opening area corresponding to the operation amount and the discharge pressure, the required bleed information output unit outputs, as the required bleed information, a required bleed flow rate corresponding to the operation amount based on a preset correspondence relationship between the operation amount and the required bleed flow rate, the required bleed flow rate being a flow rate of hydraulic oil that is required to flow through the virtual bleed circuit in order to cause the hydraulic actuator to perform a desired operation based on the operation amount, and the target control value determination unit outputs the target control value based on a larger flow rate of the virtual bleed flow rate output by the virtual bleed information output unit and the required bleed flow rate output by the required bleed information output unit.

2. The hydraulic control device according to claim 1, wherein the virtual bleed information output unit outputs the virtual bypass opening area corresponding to the operation amount based on a preset correspondence relationship between the operation amount and the virtual bypass opening area, and outputs, as the virtual bleed information, the virtual bleed flow rate corresponding to the virtual bypass opening area output based on the operation amount, and the discharge pressure, based on a correspondence relationship between the virtual bypass opening area, the discharge pressure, and the virtual bleed flow rate.

3. The hydraulic control device according to claim 1, wherein the required bleed information output unit outputs a required flow rate corresponding to the operation amount based on a preset correspondence relationship between the operation amount and the required flow rate, the required flow rate being a flow rate of hydraulic oil to be supplied to the hydraulic actuator to cause the hydraulic actuator to perform a desired operation based on the operation amount, and outputs the required bleed flow rate corresponding to the required flow rate output based on the operation amount based on a preset correspondence relationship between the required flow rate and the required bleed flow rate that is a flow rate of hydraulic oil that is required to flow into the virtual bleed circuit to supply hydraulic oil at the required flow rate.

4. A hydraulic device comprising:

a hydraulic actuator; a hydraulic pump that discharges hydraulic oil; a control valve that switches between a supply state and a discharge state of hydraulic oil from the hydraulic pump to the hydraulic actuator based on an operation amount of an operation tool; and the hydraulic control device according to claim 1 that controls the hydraulic pump.

5. A hydraulic control device for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the hydraulic control device comprising:

a virtual bleed information output unit that outputs virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line;

a required bleed information output unit that outputs required bleed information indicating the state of hydraulic oil flowing through the virtual bleed circuit that is required to cause the hydraulic actuator to perform a desired operation based on the operation amount;

a target control value determination unit that determines a target control value for the hydraulic pump based on a comparison result between the virtual bleed information and the required bleed information; and a pump control unit that controls the hydraulic pump based on the target control value, wherein the virtual bleed information output unit outputs a virtual bypass opening area corresponding to the operation amount based on a preset correspondence relationship between the operation amount and the virtual bypass opening area, the virtual bypass opening area being an opening area of a virtual control valve provided in the virtual bleed circuit, and outputs the virtual bleed information based on the output virtual bypass opening area and the discharge pressure, the virtual bleed information output unit outputs, as the virtual bleed information, a virtual bleed differential pressure corresponding to: the virtual bypass opening area corresponding to the operation amount specified based on a preset correspondence relationship between the virtual bypass opening area corresponding to the operation amount, the discharge pressure, and the virtual bleed differential pressure, the virtual bleed differential pressure being a differential pressure across a throttle resistance provided in the virtual bleed circuit; and the discharge pressure, the required bleed information output unit outputs, as the required bleed information, a required bleed differential pressure corresponding to the operation amount that is output based on a preset correspondence relationship between the operation amount and the required bleed differential pressure, the required bleed differential pressure being a differential pressure across the throttle resistance necessary for causing the hydraulic actuator to perform a desired operation based on the operation amount, and the target control value determination unit outputs the target control value based on a larger differential pressure of the virtual bleed differential pressure output by the virtual bleed information output unit and the required bleed differential pressure output by the required bleed information output unit.

6. The hydraulic control device according to claim 5, wherein the virtual bleed information output unit specifies a virtual bleed flow rate corresponding to the virtual bypass opening area corresponding to the operation amount and the discharge pressure, based on a preset correspondence relationship between the virtual bypass opening area corresponding to the operation amount, the discharge pressure, and the virtual bleed flow rate, the virtual bleed flow rate being a flow rate of hydraulic oil flowing through the virtual bleed circuit, and outputs, as the virtual bleed information, the virtual bleed differential pressure corresponding to the virtual bleed flow rate specified based on a preset correspondence relationship between the virtual bleed flow rate and the virtual bleed differential pressure.

7. The hydraulic control device according to claim 5, wherein the required bleed information output unit outputs a required bleed flow rate corresponding to the operation amount based on a preset correspondence relationship between the operation amount and the required bleed flow rate, the required bleed flow rate being a flow rate of hydraulic oil that is required to flow through the virtual bleed circuit in order to cause the hydraulic actuator to perform a desired operation based on the operation amount, and outputs the required bleed differential pressure corresponding to the required bleed flow rate output based on the operation amount based on a preset correspondence relationship between the required bleed flow rate and the required bleed differential pressure, or outputs a required flow rate corresponding to the operation amount based on a preset correspondence relationship between the operation amount and the required flow rate, the required flow rate being a flow rate of hydraulic oil to be supplied to the hydraulic actuator to cause the hydraulic actuator to perform a desired operation based on the operation amount, outputs the required bleed flow rate corresponding to the required flow rate output based on the operation amount based on a preset correspondence relationship between the required flow rate and the required bleed flow rate, and outputs the required bleed differential pressure corresponding to the required bleed flow rate output based on the operation amount based on a preset correspondence relationship between the required bleed flow rate and the required bleed differential pressure.

8. A hydraulic control device for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the hydraulic control device comprising:

a virtual bleed information output unit that outputs virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line;

a required bleed information output unit that outputs required bleed information indicating the state of hydraulic oil flowing through the virtual bleed circuit that is required to cause the hydraulic actuator to perform a desired operation based on the operation amount;

a target control value determination unit that determines a target control value for the hydraulic pump based on a comparison result between the virtual bleed information and the required bleed information; and a pump control unit that controls the hydraulic pump based on the target control value, wherein the virtual bleed information output unit outputs a virtual bypass opening area corresponding to the operation amount based on a preset correspondence relationship between the operation amount and the virtual bypass opening area, the virtual bypass opening area being an opening area of a virtual control valve provided in the virtual bleed circuit, and outputs the virtual bleed information based on the output virtual bypass opening area and the discharge pressure, the virtual bleed information output unit outputs, as the virtual bleed information, a virtual pump flow rate corresponding to the operation amount and the discharge pressure based on a preset correspondence relationship between the virtual bypass opening area corresponding to the operation amount, the discharge pressure, and the virtual pump flow rate, the virtual pump flow rate being a flow rate of hydraulic oil discharged from the hydraulic pump when the virtual bleed circuit is assumed to be present, the required bleed information output unit outputs, as the required bleed information, a required pump flow rate based on a preset correspondence relationship between the operation amount and the required pump flow rate, the required pump flow rate being a flow rate of hydraulic oil to be discharged from the hydraulic pump to supply hydraulic oil to the hydraulic actuator for operating the hydraulic actuator based on the operation amount, and the target control value determination unit outputs the target control value based on a smaller pump flow rate of the virtual pump flow rate output by the virtual bleed information output unit and the required pump flow rate corresponding to the operation amount output from the required bleed information output unit.

9. A hydraulic control device for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the hydraulic control device comprising:

a virtual bleed information output unit that outputs virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line;

a required bleed information output unit that outputs required bleed information indicating the state of hydraulic oil flowing through the virtual bleed circuit that is required to cause the hydraulic actuator to perform a desired operation based on the operation amount;

a target control value determination unit that determines a target control value for the hydraulic pump based on a comparison result between the virtual bleed information and the required bleed information; and a pump control unit that controls the hydraulic pump based on the target control value, wherein the pump control unit outputs a target pump displacement based on the target control value determined by the target control value determination unit, and controls the hydraulic pump so that a displacement of the hydraulic pump approaches the target pump displacement.

10. The hydraulic control device according to claim 9, further comprising an actual pump displacement acquisition unit that acquires an actual pump displacement of the hydraulic pump or information that can specify the actual pump displacement, wherein the pump control unit controls the hydraulic pump so as to reduce a difference between the actual pump displacement of the hydraulic pump and the target pump displacement.

11. The hydraulic control device according to claim 10, wherein the pump control unit outputs a pump control command pressure required when the hydraulic pump discharges hydraulic oil corresponding to the target control value determined by the target control value determination unit by making a correction based on a difference between the actual pump displacement and the target pump displacement, and controls the hydraulic pump.

12. A control method for controlling a hydraulic circuit including a hydraulic actuator, a hydraulic pump that discharges hydraulic oil, and a control valve that switches between a supply state and a discharge state of hydraulic oil from the hydraulic pump to the hydraulic actuator based on an operation amount of an operation tool, the control method comprising:

outputting virtual bleed information indicating a state of hydraulic oil flowing through a virtual bleed circuit based on an operation amount of the operation tool, a discharge pressure of the hydraulic pump, and a preset virtual bleed characteristic that is a characteristic of the virtual bleed circuit to which the control valve and a hydraulic oil tank are assumed to be connected by a bypass line;

outputting required bleed information indicating the state of hydraulic oil flowing through the virtual bleed circuit that is required to cause the hydraulic actuator to perform a desired operation based on the operation amount;

determining a target control value for the hydraulic pump based on a comparison result between the virtual bleed information and the required bleed information; and controlling the hydraulic pump based on the target control value, outputting a virtual bypass opening area corresponding to the operation amount based on a preset correspondence relationship between the operation amount and the virtual bypass opening area, the virtual bypass opening area being an opening area of a virtual control valve provided in the virtual bleed circuit, and outputting the virtual bleed information based on the output virtual bypass opening area and the discharge pressure, outputting, as the virtual bleed information, a virtual bleed flow rate that is a flow rate of hydraulic oil flowing through the virtual bleed circuit, based on the virtual bypass opening area corresponding to the operation amount and the discharge pressure, outputting, as the required bleed information, a required bleed flow rate corresponding to the operation amount based on a preset correspondence relationship between the operation amount and the required bleed flow rate, the required bleed flow rate being a flow rate of hydraulic oil that is required to flow through the virtual bleed circuit in order to cause the hydraulic actuator to perform a desired operation based on the operation amount, and outputting the target control value based on a larger flow rate of the output virtual bleed flow rate and the output required bleed flow rate.

* * * * *